(12) United States Patent
Radulescu et al.

(10) Patent No.: US 10,952,142 B2
(45) Date of Patent: Mar. 16, 2021

(54) ENERGY-EFFICIENT PAGING IN WIRELESS NETWORKS

(71) Applicant: QUALCOMM Incorporated, San Diego, CA (US)

(72) Inventors: Andrei Dragos Radulescu, San Diego, CA (US); Alexei Yurievitch Gorokhov, San Diego, CA (US); Chengjin Zhang, San Diego, CA (US); Chirag Sureshbhai Patel, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 15/633,376

(22) Filed: Jun. 26, 2017

(65) Prior Publication Data

US 2018/0054780 A1 Feb. 22, 2018

Related U.S. Application Data

(60) Provisional application No. 62/375,890, filed on Aug. 16, 2016.

(51) Int. Cl.
*H04L 12/00* (2006.01)
*H04W 52/02* (2009.01)
(Continued)

(52) U.S. Cl.
CPC ....... *H04W 52/0219* (2013.01); *H04W 24/02* (2013.01); *H04W 52/0216* (2013.01);
(Continued)

(58) Field of Classification Search
None
See application file for complete search history.

(56) References Cited

U.S. PATENT DOCUMENTS

2010/0130237 A1* 5/2010 Kitazoe ................ H04W 76/28
455/458
2011/0211466 A1* 9/2011 Kazmi ............... H04W 52/0261
370/252
(Continued)

FOREIGN PATENT DOCUMENTS

WO WO-2007149732 A1 12/2007

OTHER PUBLICATIONS

Ericsson, "Paging and (E)DRX," 3GPP TSG-RAN2 Meeting #93bis, R2-162686, Dubrovnik, Malta, Apr. 11-15, 2016, 10 pgs., XP051082499, 3rd Generation Partnership Project.
(Continued)

*Primary Examiner* — Ajit Patel
*Assistant Examiner* — Lionel Preval
(74) *Attorney, Agent, or Firm* — Holland & Hart LLP

(57) ABSTRACT

Methods, systems, and devices for wireless communication are described. A user equipment (UE) and a base station operating in unlicensed spectrum may temporarily increase a paging opportunity window (POW) size, or reduce a time between POWs, in order to meet performance metrics or account for time periods when a base station is unable to win access to the wireless medium during a POW. In some cases, a UE may identify a failed listen-before-talk procedure and autonomously update the POW size. In other examples, a base station may initiate a change in POW size or increase a number of paging opportunities in order to meet achieve one or more key performance indicators (KPIs). After a predetermined period, or after a triggering condition is no longer present, the UE and the base station may reset the POW size or the number of paging opportunities to a nominal amount to conserve power.

30 Claims, 16 Drawing Sheets

(51) Int. Cl.
*H04W 76/28* (2018.01)
*H04W 68/02* (2009.01)
*H04W 24/02* (2009.01)
*H04W 72/12* (2009.01)

(52) U.S. Cl.
CPC ....... *H04W 68/02* (2013.01); *H04W 72/1257* (2013.01); *H04W 76/28* (2018.02); *H04W 72/12* (2013.01); *Y02D 30/70* (2020.08)

(56) References Cited

U.S. PATENT DOCUMENTS

| | | | |
|---|---|---|---|
| 2013/0210420 A1 | 8/2013 | Deivasigamani et al. | |
| 2014/0036748 A1 | 2/2014 | Mukherjee et al. | |
| 2016/0073344 A1 | 3/2016 | Vutukuri et al. | |
| 2017/0257842 A1* | 9/2017 | Hessler | H04W 68/02 |
| 2017/0311284 A1* | 10/2017 | Basu Mallick | H04W 68/02 |
| 2018/0199308 A1* | 7/2018 | Liu | H04W 52/0274 |
| 2018/0255576 A1* | 9/2018 | Bhorkar | H04L 27/0006 |
| 2019/0124517 A1* | 4/2019 | Sugirtharaj | H04W 16/14 |

OTHER PUBLICATIONS

ISA/EP, International Search Report and Written Opinion of the International Searching Authority, Int'l Application No. PCT/US2017/042423, dated Oct. 24, 2017, European Patent Office, Rijswijk, NL, 16 pgs.

Siemens, "Adaptive DRX Setting for LTE Paging," 3GPP TSG-RAN WG2 Meeting #55, R2-062818, Seoul, Korea, Oct. 9-13, 2006, 2 pgs., XP002434318, 3rd Generation Partnership Project.

\* cited by examiner

ENERGY-EFFICIENT PAGING IN WIRELESS NETWORKS

CROSS REFERENCES

The present application for patent claims priority to U.S. Provisional Patent Application No. 62/375,890 by Radulescu, et al., entitled "Energy-Efficient Paging In Wireless Networks," filed Aug. 16, 2016, assigned to the assignee hereof.

BACKGROUND

The following relates generally to wireless communication and more specifically to energy-efficient paging in wireless networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

SUMMARY

A user equipment (UE) and a base station operating in an unlicensed or shared spectrum may temporarily increase a paging opportunity window (POW) size or reduce a time between POWs (or both) e.g., in order to meet performance metrics. In some cases, a UE may identify a failed listen-before-talk (LBT) procedure and autonomously update the POW size. In other examples, a base station may identify a trigger for a change in POW size or otherwise increasing a number of paging opportunities in order to achieve one or more key performance indicators (KPIs). The base station may then communicate the change to the UE either explicitly or implicitly. In some cases, a UE may indicate a preference for an increased number of paging opportunities to the base station. After a predetermined period, or after a triggering condition is no longer present, the UE and the base station may reset the POW size (e.g., duration) or the number of paging opportunities to a nominal amount to conserve power.

A method of wireless communication is described. The method may include monitoring a cell during a first POW having a first duration, identifying a LBT failure condition during the first POW based at least in part on the monitoring, and determining a second duration for a second POW based at least in part on identifying the LBT failure condition. In some cases, the second duration is greater than or equal to the first duration.

An apparatus for wireless communication is described. The apparatus may include means for monitoring a cell during a first POW having a first duration, means for identifying a LBT failure condition during the first POW based at least in part on the monitoring, and means for determining a second duration for a second POW based at least in part on identifying the LBT failure condition. In some cases, the second duration is greater than or equal to the first duration.

Another apparatus for wireless communication is described. The apparatus may include a processor, memory in electronic communication with the processor, and instructions stored in the memory. The instructions may be operable to cause the processor to monitor a cell during a first POW having a first duration, identify a LBT failure condition during the first POW based at least in part on the monitoring, and determine a second duration for a second POW based at least in part on identifying the LBT failure condition. In some cases, the second duration is greater than or equal to the first duration.

A non-transitory computer readable medium for wireless communication is described. The non-transitory computer-readable medium may include instructions operable to cause a processor to monitor a cell during a first POW having a first duration, identify a LBT failure condition during the first POW based at least in part on the monitoring, and determine a second duration for a second POW based at least in part on identifying the LBT failure condition. In some cases, the second duration is greater than or equal to the first duration.

Some examples of the method, apparatus, and non-transitory computer-readable medium described above may further include processes, features, means, or instructions for monitoring the cell for the second duration during the second POW based at least in part on identifying the LBT failure condition.

Some examples of the method, apparatus, and non-transitory computer-readable medium described above may further include processes, features, means, or instructions for identifying a POW reset condition. Some examples of the method, apparatus, and non-transitory computer-readable medium described above may further include processes, features, means, or instructions for monitoring the cell for the first duration during a third POW based at least in part on identifying the POW reset condition.

In some examples of the method, apparatus, and non-transitory computer-readable medium described above, identifying the LBT failure condition comprises: identifying an absence of a reference signal during the POW.

Some examples of the method, apparatus, and non-transitory computer-readable medium described above may further include processes, features, means, or instructions for determining that a number of missing reference signals exceeds a threshold, wherein the absence of the reference signal may be identified based at least in part on determining that the threshold may be exceeded.

A method of wireless communication is described. The method may include receiving a message that indicates an increased number of paging opportunities for a UE, wherein the increased number of paging opportunities is greater than a nominal number of paging opportunities for the UE, monitoring a cell during one paging opportunity of the increased number of paging opportunities, identifying a paging opportunity reset condition, and resetting a discontinuous reception (DRX) cycle or a POW duration based at least in part on identifying the paging opportunity reset condition.

An apparatus for wireless communication is described. The apparatus may include means for receiving a message that indicates an increased number of paging opportunities for a UE, wherein the increased number of paging opportunities is greater than a nominal number of paging opportunities for the UE, means for monitoring a cell during one paging opportunity of the increased number of paging opportunities, means for identifying a paging opportunity reset condition, and means for resetting a DRX cycle or a POW duration based at least in part on identifying the paging opportunity reset condition.

Another apparatus for wireless communication is described. The apparatus may include a processor, memory in electronic communication with the processor, and instructions stored in the memory. The instructions may be operable to cause the processor to receive a message that indicates an increased number of paging opportunities for a UE, wherein the increased number of paging opportunities is greater than a nominal number of paging opportunities for the UE, monitor a cell during one paging opportunity of the increased number of paging opportunities, identify a paging opportunity reset condition, and reset a DRX cycle or a POW duration based at least in part on identifying the paging opportunity reset condition.

A non-transitory computer readable medium for wireless communication is described. The non-transitory computer-readable medium may include instructions operable to cause a processor to receive a message that indicates an increased number of paging opportunities for a UE, wherein the increased number of paging opportunities is greater than a nominal number of paging opportunities for the UE, monitor a cell during one paging opportunity of the increased number of paging opportunities, identify a paging opportunity reset condition, and reset a DRX cycle or a POW duration based at least in part on identifying the paging opportunity reset condition.

In some examples of the method, apparatus, and non-transitory computer-readable medium described above, receiving the message that indicates the increased number of paging opportunities comprises: receiving a message indicating that system information may have changed.

Some examples of the method, apparatus, and non-transitory computer-readable medium described above may further include processes, features, means, or instructions for monitoring the cell during a first subframe and a second subframe of a paging frame, wherein the message indicating the increased number of paging opportunities may be received during the second subframe of the paging frame.

Some examples of the method, apparatus, and non-transitory computer-readable medium described above may further include processes, features, means, or instructions for transmitting a response to the message, wherein the increased number of paging opportunities may be based at least in part on the response.

In some examples of the method, apparatus, and non-transitory computer-readable medium described above, the message indicating the increased number of paging opportunities comprises a message indicating that a POW duration may be insufficient for a number of user UEs being paged.

In some examples of the method, apparatus, and non-transitory computer-readable medium described above, the increased number of paging opportunities comprises a decreased DRX cycle or an increased POW duration, or both.

A method of wireless communication is described. The method may include performing a LBT procedure during a first POW having a first duration, identifying an LBT failure condition during the first POW based at least in part on performing the LBT procedure, and determining a second duration for a second POW based at least in part on identifying the LBT failure condition. In some cases, the second duration is greater than or equal to the first duration.

An apparatus for wireless communication is described. The apparatus may include means for performing a LBT procedure during a first POW having a first duration, means for identifying an LBT failure condition during the first POW based at least in part on performing the LBT procedure, and means for determining a second duration for a second POW based at least in part on identifying the LBT failure condition. In some cases, the second duration is greater than or equal to the first duration.

Another apparatus for wireless communication is described. The apparatus may include a processor, memory in electronic communication with the processor, and instructions stored in the memory. The instructions may be operable to cause the processor to perform a LBT procedure during a first POW having a first duration, identify an LBT failure condition during the first POW based at least in part on performing the LBT procedure, and determine a second duration for a second POW based at least in part on identifying the LBT failure condition. In some cases, the second duration is greater than or equal to the first duration.

A non-transitory computer readable medium for wireless communication is described. The non-transitory computer-readable medium may include instructions operable to cause a processor to perform a LBT procedure during a first POW having a first duration, identify an LBT failure condition during the first POW based at least in part on performing the LBT procedure, and determine a second duration for a second POW based at least in part on identifying the LBT failure condition. In some cases, the second duration is greater than or equal to the first duration.

Some examples of the method, apparatus, and non-transitory computer-readable medium described above may further include processes, features, means, or instructions for transmitting a reference signal or a paging message during a second POW that may have the second duration.

Some examples of the method, apparatus, and non-transitory computer-readable medium described above may further include processes, features, means, or instructions for identifying a POW reset condition. Some examples of the method, apparatus, and non-transitory computer-readable medium described above may further include processes, features, means, or instructions for transmitting the reference signal or the paging message for the first duration during a third POW based at least in part on identifying the POW reset condition.

A method of wireless communication is described. The method may include increasing a number of paging opportunities based at least in part on a paging opportunity trigger condition, transmitting a paging message or a reference signal to one or more UEs during one or more paging opportunities of the increased number of paging opportunities, identifying a paging opportunity reset condition, and resetting a DRX cycle or a POW duration based at least in part on the paging opportunity reset condition.

An apparatus for wireless communication is described. The apparatus may include means for increasing a number of paging opportunities based at least in part on a paging opportunity trigger condition, means for transmitting a paging message or a reference signal to one or more UEs during one or more paging opportunities of the increased number of paging opportunities, means for identifying a paging opportunity reset condition, and means for resetting a DRX cycle or a POW duration based at least in part on the paging opportunity reset condition.

Another apparatus for wireless communication is described. The apparatus may include a processor, memory in electronic communication with the processor, and instructions stored in the memory. The instructions may be operable to cause the processor to increase a number of paging opportunities based at least in part on a paging opportunity trigger condition, transmit a paging message or a reference signal to one or more UEs during one or more paging opportunities of the increased number of paging opportunities, identify a paging opportunity reset condition, and reset a DRX cycle or a POW duration based at least in part on the paging opportunity reset condition.

A non-transitory computer readable medium for wireless communication is described. The non-transitory computer-readable medium may include instructions operable to cause a processor to increase a number of paging opportunities based at least in part on a paging opportunity trigger condition, transmit a paging message or a reference signal to one or more UEs during one or more paging opportunities of the increased number of paging opportunities, identify a paging opportunity reset condition, and reset a DRX cycle or a POW duration based at least in part on the paging opportunity reset condition.

Some examples of the method, apparatus, and non-transitory computer-readable medium described above may further include processes, features, means, or instructions for determining that a paging latency exceeds a threshold, wherein the paging opportunity trigger condition comprises the threshold being exceeded.

Some examples of the method, apparatus, and non-transitory computer-readable medium described above may further include processes, features, means, or instructions for determining that a number of missed paging opportunities exceeds a threshold, wherein the paging opportunity trigger condition comprises the threshold being exceeded.

Some examples of the method, apparatus, and non-transitory computer-readable medium described above may further include processes, features, means, or instructions for determining that a number of UEs impacted by paging latency or missed paging opportunities exceeds a threshold, wherein the paging opportunity trigger condition comprises the threshold being exceeded.

In some examples of the method, apparatus, and non-transitory computer-readable medium described above, the number of UEs impacted by paging latency or missed paging opportunities may be based at least in part on a UE class or service category.

In some examples of the method, apparatus, and non-transitory computer-readable medium described above, the paging opportunity trigger condition may be based at least in part on a condition of one or more UEs.

Some examples of the method, apparatus, and non-transitory computer-readable medium described above may further include processes, features, means, or instructions for determining that a time between successful LBT procedures for paging opportunities exceeds a threshold, wherein the paging opportunity trigger condition comprises the threshold being exceeded.

Some examples of the method, apparatus, and non-transitory computer-readable medium described above may further include processes, features, means, or instructions for increasing the number of paging opportunities comprises decreasing the DRX cycle or increasing the POW duration, or both.

Some examples of the method, apparatus, and non-transitory computer-readable medium described above may further include processes, features, means, or instructions for determining that decreasing the DRX cycle may be prioritized over increasing the POW duration, wherein decreasing the DRX cycle or increasing POW duration, or both, may be based at least in part on the determination.

Some examples of the method, apparatus, and non-transitory computer-readable medium described above may further include processes, features, means, or instructions for transmitting an indication that system information may have changed. Some examples of the method, apparatus, and non-transitory computer-readable medium described above may further include processes, features, means, or instructions for transmitting a system information message indicating the increased number of paging opportunities.

Some examples of the method, apparatus, and non-transitory computer-readable medium described above may further include processes, features, means, or instructions for transmitting a message to at least one idle mode UE during a second subframe of a paging frame. Some examples of the method, apparatus, and non-transitory computer-readable medium described above may further include processes, features, means, or instructions for receiving a response to the message from the at least one idle mode UE, wherein the number of paging opportunities may be increased based at least in part on receiving the response.

DETAILED DESCRIPTION

Figure 1:
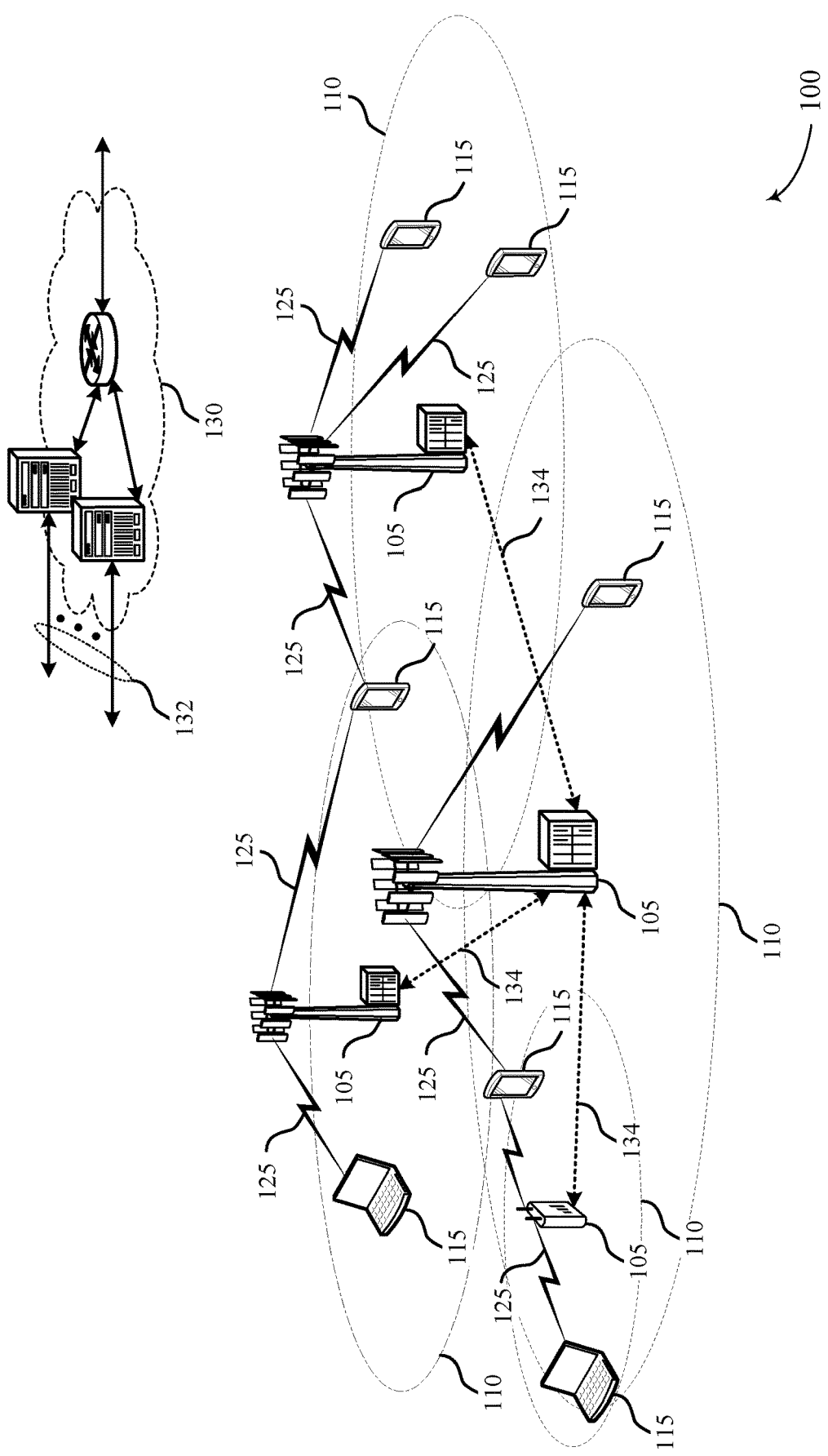
FIGS. 1 and 2 illustrate examples of a system for wireless communication that supports energy-efficient paging in accordance with aspects of the present disclosure.

A user equipment (UE) in an idle mode may monitor a cell during a predetermined time period for paging messages. A UE and a base station communicating using an unlicensed or shared spectrum may use a monitoring period, or paging opportunity window (POW), with a duration designed to account for the possibility that the base station may not win access to the medium during a portion of the POW. In some cases, a longer duration POW may increase the probability that the base station may win access to the medium during a portion of the POW. However, a longer duration of the POW may affect UE power consumption, which may cause a drain on the battery and reduce the time that the device may function on battery power.

As described herein, a duration of the POW may be dynamically changed, and either the UE or base station, or both, may adjust their timing and operation to account for the changed paging opportunity window. Adjusting the duration of the POW may allow the UE to conserve power (e.g., because a longer duration POW may cause the UE to consume excessive power while monitoring a channel and actively receiving and decoding radio frequency (RF) signals). A shorter duration POW may decrease the time that the UE monitors for pages between sleep cycles, which may decrease power demands on the UE but, in some cases, may not give a base station sufficient time to acquire the transmission medium (e.g., shared spectrum) and send a paging message.

A POW may be configured for a nominal duration (e.g. 1 ms) and adjusted to balance the UE's power consumption with the base station's ability to effectively send paging messages. The UE and base station may each operate according to the nominal POW duration, and they may increase a number of paging opportunities (e.g., by increasing the POW size or POW frequency, or both) to assist with access to the transmission medium.

By way of example, the base station may increase the number of paging opportunities after determining that a listen-before-talk (LBT) procedure has failed or based on performance indicators that suggest that the current number of paging opportunities is insufficient to support the current user needs in the system. In some examples, the base station may increase the duration of the POW if it fails an LBT procedure. Alternatively, the base station may transmit a reference signal to the UE if the base station acquires access to the transmission medium. If the UE misses a reference signal from the base station, the UE may determine that the base station could not access the medium, and the UE may monitor for a longer duration in a subsequent POW or may monitor for a paging message more frequently, or both.

In other examples, the base station may monitor performance indicators such as latency and capacity metrics, and the base station may increase the number of paging opportunities based on the metrics. For example, if UEs are unable to receive paging due to medium contention or capacity limitations, the base station may increase the number of paging opportunities by either increasing the POW duration or increasing a rate at which UEs are paged (e.g., decreasing a time between successive POWs).

Aspects of the disclosure introduced above are described below in the context of a wireless communications system. An example of a process flow that illustrates dynamic update of a nominal POW size or POW schedule is then described. Aspects of the disclosure are further illustrated by and described with reference to apparatus diagrams, system diagrams, and flowcharts that relate to energy-efficient paging.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network and/or a network configured in accordance with fifth generation (5G)/new radio (NR) technology. Wireless communications system 100 may support dynamic updating of a POW size or a periodicity of paging opportunities in order to account for operations in shared or unlicensed spectrum and to conserve power. The change in POW size or periodicity may be initiated at a UE 115 or a base station 105.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs).

In some cases, wireless system 100 may utilize both licensed and unlicensed radio frequency spectrum bands. For example, wireless system 100 may employ LTE License Assisted Access (LTE-LAA), LTE Unlicensed (LTE-U) radio access, or MulteFire technology in an unlicensed band such as the 5 GHz Industrial, Scientific, and Medical (ISM) band. When operating in shared or unlicensed radio frequency spectrum bands, wireless devices such as base stations 105 and UEs 115 may employ LBT procedures to ensure the channel is clear before transmitting data. In some cases, operations in unlicensed bands may be based on a carrier aggregation (CA) configuration in conjunction with component carriers (CCs) operating in a licensed band. Operations in an unlicensed spectrum may include DL transmissions, UL transmissions, or both. Duplexing in an unlicensed spectrum may be based on frequency division duplexing (FDD), time division duplexing (TDD) or a combination of both.

Devices operating in a shared or unlicensed spectrum may perform an LBT procedure such as a clear channel assessment (CCA) prior to communicating in order to determine whether the channel is available. A CCA may include an energy detection procedure to determine whether there are any other active transmissions. For example, the device may infer that a received signal strength indicator (RSSI) of a power meter being above a threshold indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

A UE 115 may enter an idle mode and periodically wake up to receive paging messages. In some cases, a UE 115 in an idle mode may be assigned a paging radio network temporary identity (P-RNTI). If the serving gateway (S-GW) receives data for the UE 115, it may notify the mobility management entity (MME), which may send a paging message to every base station 105 within an area known as a tracking area. Each base station 105 within the tracking area may send a paging message with the P-RNTI. Thus, the UE may remain in an idle mode without updating (e.g., communicating with) the MME until it leaves the tracking area. In some cases, paging messages may be transmitted during periodic POWs. The POW size or frequency may be increased to meet performance metrics (e.g., may be increased when a base station fails to gain access to the transmission medium). The POW size (or periodicity) may be subsequently reset to a nominal setting when the trigger condition no longer exists (e.g., in order to conserve power).

Figure 2:
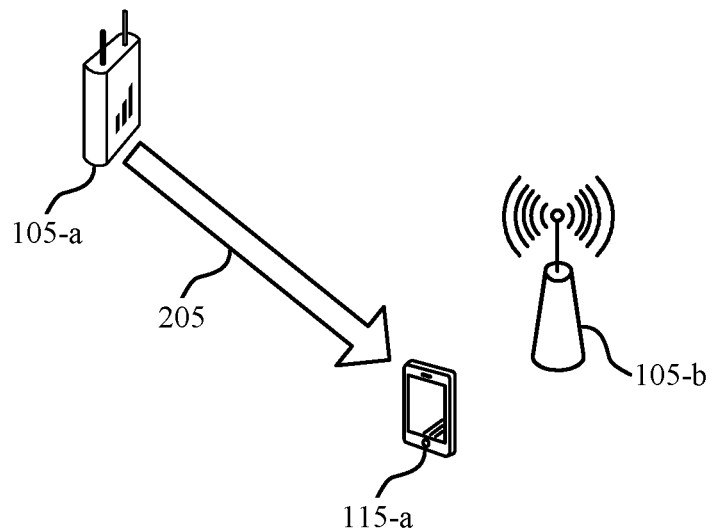

FIG. 2 illustrates an example of a system for wireless communication 200 that supports energy-efficient paging. The system for wireless communication 200 may also include UE 115-a, which may be an example of a UE 115 of FIG. 1. Base station 105-a and UE 115-a may communicate over a shared (e.g., unlicensed) radio frequency spectrum. Base station 105-b may also use the same unlicensed spectrum resources, so each base station 105 may perform a LBT procedure in order to ensure access to the transmission medium. Therefore, base station 105-a may compete for the transmission medium with other base stations 105 or UEs 115 (e.g., in order to page UE 115-a).

UE 115-a may expect a page 205 from base station 105-a within a POW. UE 115-a may dynamically change the POW size to conserve power while maintaining a transmission performance level and efficient reception of paging messages in a shared transmission medium. A large POW size may consume excessive power, but a short POW duration may not give base station 105-a sufficient time to acquire the transmission medium and send a paging message. The POW may be configured for a nominal duration (e.g. 1 ms). UE 115-a and base station 105-a may increase a number of paging opportunities to assist with access to the transmission medium.

In some examples, base station 105-a may increase the POW if it fails an LBT procedure. Alternatively, base station 105-a may transmit a reference signal to UE 115-a if base station 105-a acquires access to the transmission medium during the POW. If UE 115-a misses a reference signal from base station 105-a, UE 115-a may determine that base station 105-a could not access the medium, and UE 115-a may increase the duration that it monitors for paging during a subsequent POW. In other examples, base station 105-a may monitor performance indicators such as latency and capacity metrics, and base station 105-a may increase the number of paging opportunities based on the metrics. For instance, if one or more UEs 115 are unable to receive paging (e.g., due to medium contention or capacity limitations), base station 105-a may increase the number of paging opportunities by either increasing the POW size or increasing a rate at which UEs 115 are paged.

Additionally or alternatively, UE 115-a may dynamically change a POW duration (e.g., to conserve power). A longer duration POW may consume excessive power, but a short duration POW may not give base station 105-a sufficient time to acquire the transmission medium and send a paging message. Therefore, UE 115-a may initially monitor for paging using a nominal duration POW, which may be relatively short in duration (e.g., 1 ms), and determine if base station 105-a has acquired the transmission medium during the POW. If UE 115-a determines that base station 105-a was unable to acquire access to the transmission medium, UE 115-a may increase the duration that it monitors for paging during a subsequent POW.

In other words, UE 115-a may increase the monitoring period if base station 105-a fails to acquire access to the medium within a certain time period (e.g., a current POW). Base station 105-a may transmit a reference signal if base station 105-a acquires the transmission medium even if base station 105-a is not paging UE 115-a (e.g., to indicate that base station 105-a can still acquire the transmission medium). That is, in some cases, base station 105-a may employ a reference signal to indicate to UE 115-a that the current POW size and/or frequency should not be adjusted because traffic over the medium is light enough that base station 105-a can still acquire the medium in the current POW (i.e., even though base station 105-a does not have data to transmit to UE 115-a). In some cases, base station 105-a may transmit a reference signal after acquiring the transmission medium (e.g., in order to allow the UE 115-a to estimate channel conditions and/or to indicate that the base station 105-a has acquired the transmission medium). UE 115-a may monitor the POW during a discontinuous reception (DRX) paging cycle (e.g., a cycle in which UE 115-a is periodically actively monitoring). Base station 105-a may transmit a cell-specific reference signal (CRS) upon accessing the transmission medium. If UE 115-a misses the reference signal in a given POW, UE 115-a may determine that the nominal POW may not accommodate all UEs 115, and UE 115-a may monitor for a longer POW for the next paging cycle. In some examples, the delay until the next POW may correspond to the DRX paging cycle.

If base station 105-a is unable to acquire the transmission medium, it may adjust a subsequent POW. Similarly, UE 115-a may adjust a subsequent POW if it does not receive a reference signal from base station 105-a during the POW. The adjustments at base station 105-a and UE 115-a may be synchronized (e.g., may represent a same adjustment in POW size and/or frequency). Base station 105-a may perform a LBT procedure prior to paging UE 115-a. If the LBT procedure succeeds, base station 105-a may transmit a reference signal (e.g., at least a CRS) during a POW (e.g., a nominal paging opportunity of 1 ms). In some cases, upon acquiring the transmission medium, base station 105-a may not transmit a paging signal (e.g., but may still transmit a reference signal to allow UE 115-a to estimate channel conditions). For example, if the LBT procedure used by the base station 105-a is a category 4 (Cat4) priority transmission (i.e., LBT with random backoff with variable contention window size), the LBT procedure may start when base station 105-a has a packet to transmit (e.g., and has already paged UE 115-a indicating of the impending packet delivery). Accordingly, the UE 115-a may be prepared to receive the transmission (e.g., based on the reference signal) without requiring an additional paging operation. If base station 105-a is to page UE 115-a, base station 105-a may allocate a paging indicator radio network temporary identifier (PI-RNTI) for UE 115-a in the nominal POW. However, if base station 105-a fails the LBT procedure but has information for UE 115-a, base station 105-a may increase the POW (e.g., to greater than 1 ms) at a subsequent paging opportunity.

In other examples, base station 105-a may increase a number of paging opportunities if it cannot meet performance expectations. Base station 105-a and UE 115-a may autonomously (e.g., independently) determine a nominal POW duration. The nominal POW duration may be 1 ms. UE 115-a may rely on the POW remaining at the nominal POW duration (e.g., such that the POW rarely exceeds the nominal duration). However, base station 105-*a* may increase a number of paging opportunities if base station 105-*a* does not meet key performance indicators (KPIs) (e.g., experiences poor latency or for capacity reasons). As an example, if a latency of a page 205 for UE 115-*a* exceeds a threshold, base station 105-*a* may increase a number of paging opportunities.

Base station 105-*a* may also increase the number of paging opportunities based on a number or ratio of missed paging opportunities by UE 115-*a* (for example, due to medium contention or overflow due to capacity limitations). Base station 105-*a* may increase the number of paging opportunities based on a number or ratio of impacted UEs 115 exceeding a threshold. The ratio threshold may be based on UE class or service category (e.g., certain forms of media such as gaming or voice may request smaller latencies while other data can accept higher latencies). Base station 105-*a* may use raw or unfiltered measurements for the ratio.

Base station 105-*a* may increase a number of paging opportunities by increasing the DRX cycle frequency or increasing the POW size, or both. Base station 105-*a* may increase the DRX paging cycle frequency instead of increasing the size of the POW. However, UE 115-*a* may indicate a preference for a longer duration POW (e.g., using a flag or other signaling (e.g., an indication of version release presently supported)). Base station 105-*a* may return to a nominal POW (e.g., 1 ms) if, for example, the conditions for an increased number of paging opportunities cease. Base station 105-*a* may have a nominal POW of any duration. The nominal (e.g., preferred) POW may be configured or indicated by UE 115-*a*. In some examples, UE 115-*a* may indicate the nominal POW to an evolved packet core (EPC) such that the EPC can inform the radio access network (RAN). Base station 105-*a* may use a first subframe (e.g., subframe 0) for a paging opportunity, but base station 105-*a* may also use another subframe (e.g., subframe 1, 2, etc.) to determine whether UE 115-*a* is able to listen to the subframe (e.g., is able to receive communications). Base station 105-*a* may use the determination for future pages or to inform the EPC of a capability of UE 115-*a*.

Figure 3:
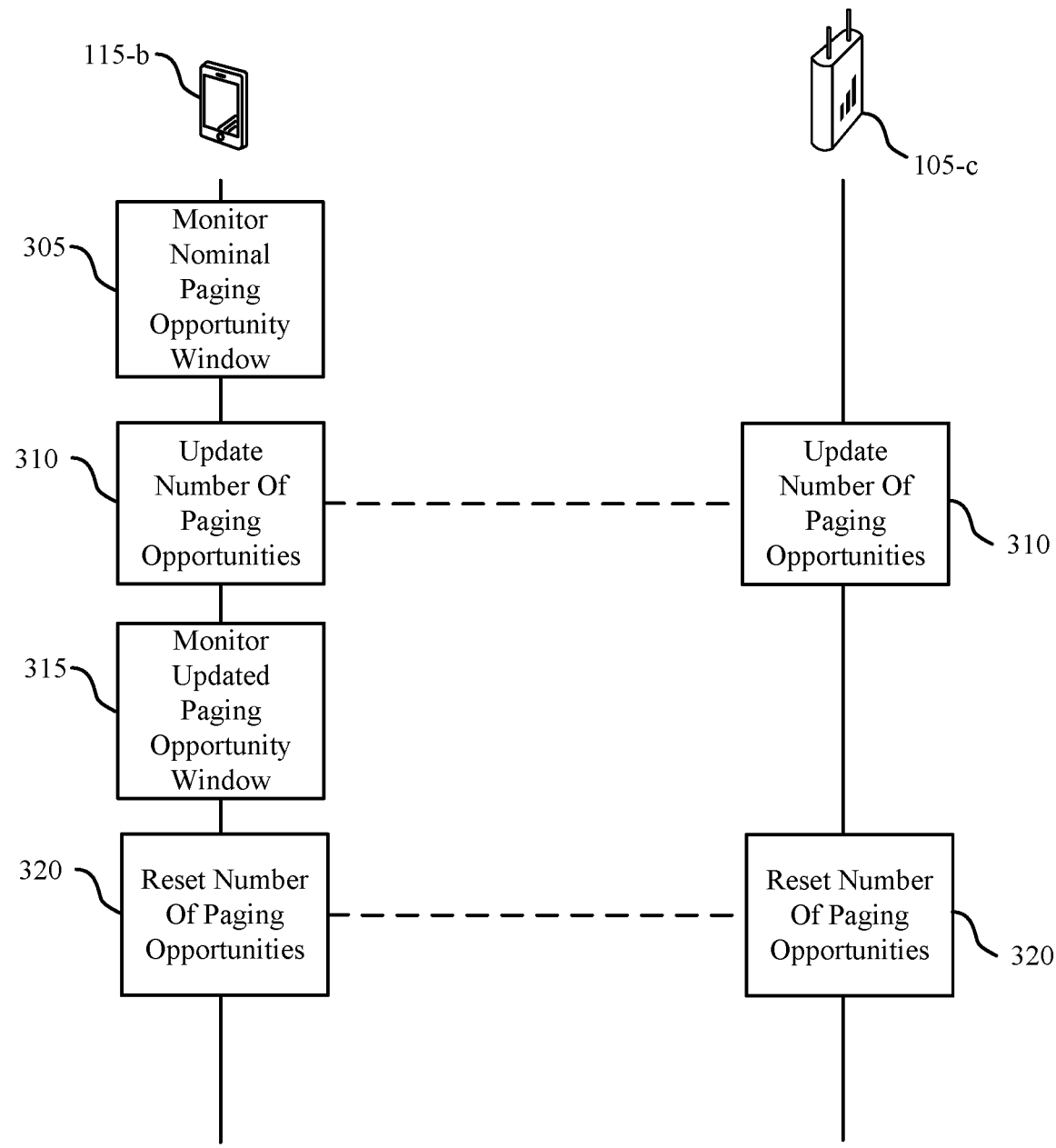
FIG. 3 illustrates an example of a process flow that supports energy-efficient paging in accordance with aspects of the present disclosure.

FIG. 3 illustrates an example of a process flow 300 for energy-efficient paging. Process flow 300 may include base station 105-*c* and UE 115-*b*, which may respectively be examples of a base station 105 and a UE 115 as described herein with reference to FIGS. 1 and 2.

At 305, UE 115-*b* may monitor a nominal POW. The nominal POW may have a first duration (e.g., 1 ms).

At 310, UE 115-*b* and base station 105-*c* may each update a number of paging opportunities. The number of paging opportunities may be updated based on whether base station 105-*c* fails a LBT procedure. Additionally or alternatively, the number of paging opportunities may be updated based on whether a paging latency exceeds a threshold, a number of missed paging opportunities exceeds a threshold, or a number of UEs impacted by paging latency or missed paging opportunities exceeds a threshold, or any combination of the above. In some examples, the number of paging opportunities may be updated by altering a DRX cycle, a POW duration, or both. Base station 105-*c* may transmit an indication that system information has changed or system information indicating the increased number of paging opportunities.

At 315, UE 115-*b* may monitor an updated POW based on the updated number of paging opportunities. For example, the updated POW may have a longer duration, POWs may occur more frequently due to a decreased DRX period, or both.

At 320, UE 115-*b* and base station 105-*c* may reset the number of paging opportunities. UE 115-*b* and base station 105-*c* may identify a paging opportunity reset condition and reset the DRX period or POW duration based on the paging opportunity reset condition. Various paging opportunity reset conditions are considered. Example conditions include meeting any of the KPIs discussed above, expiration of a time period without the presence of additional data for UE 115-*b*, a number of consecutive successful paging opportunities, a decrease in a number of UEs impacted by paging latency or missed paging opportunities, or any combination thereof. For example, the paging opportunity may be reset to a configuration of the nominal POW of step 305.

Figure 4:
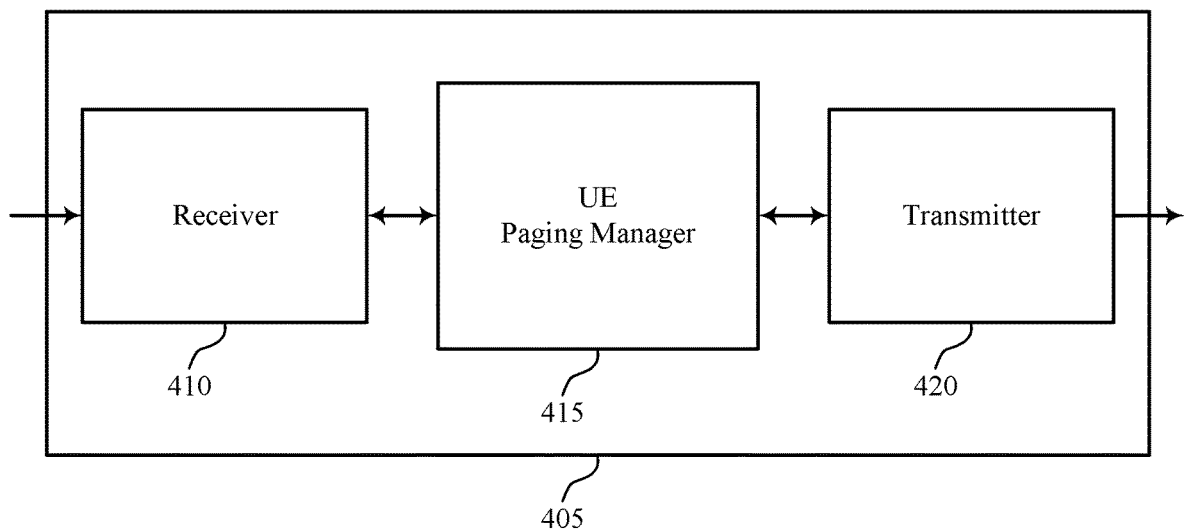
FIGS. 4 through 6 show block diagrams of a device that supports energy-efficient paging in accordance with aspects of the present disclosure.

FIG. 4 shows a block diagram 400 of a wireless device 405 that supports energy-efficient paging in accordance with various aspects of the present disclosure. Wireless device 405 may be an example of aspects of a UE 115 as described with reference to FIG. 1. Wireless device 405 may include receiver 410, UE paging manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to energy-efficient paging, etc.). Information may be passed on to other components of the device. The receiver 410 may be an example of aspects of the transceiver 735 described with reference to FIG. 7.

UE paging manager 415 may be an example of aspects of the UE paging manager 715 described with reference to FIG. 7. UE paging manager 415 may monitor a cell during a first POW having a first duration, identify a LBT failure condition during the first POW based on the monitoring, and determine a second duration for a second POW based on identifying the LBT failure condition. In some examples, the second duration is greater than or equal to the first duration.

The UE paging manager 415 may also receive a message that indicates an increased number of paging opportunities for a UE, where the increased number of paging opportunities is greater than a nominal number of paging opportunities for the UE, monitor a cell during one paging opportunity of the increased number of paging opportunities, identify a paging opportunity reset condition, and reset a DRX cycle or a POW duration based on identifying the paging opportunity reset condition.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may include a single antenna, or it may include a set of antennas.

Figure 5:
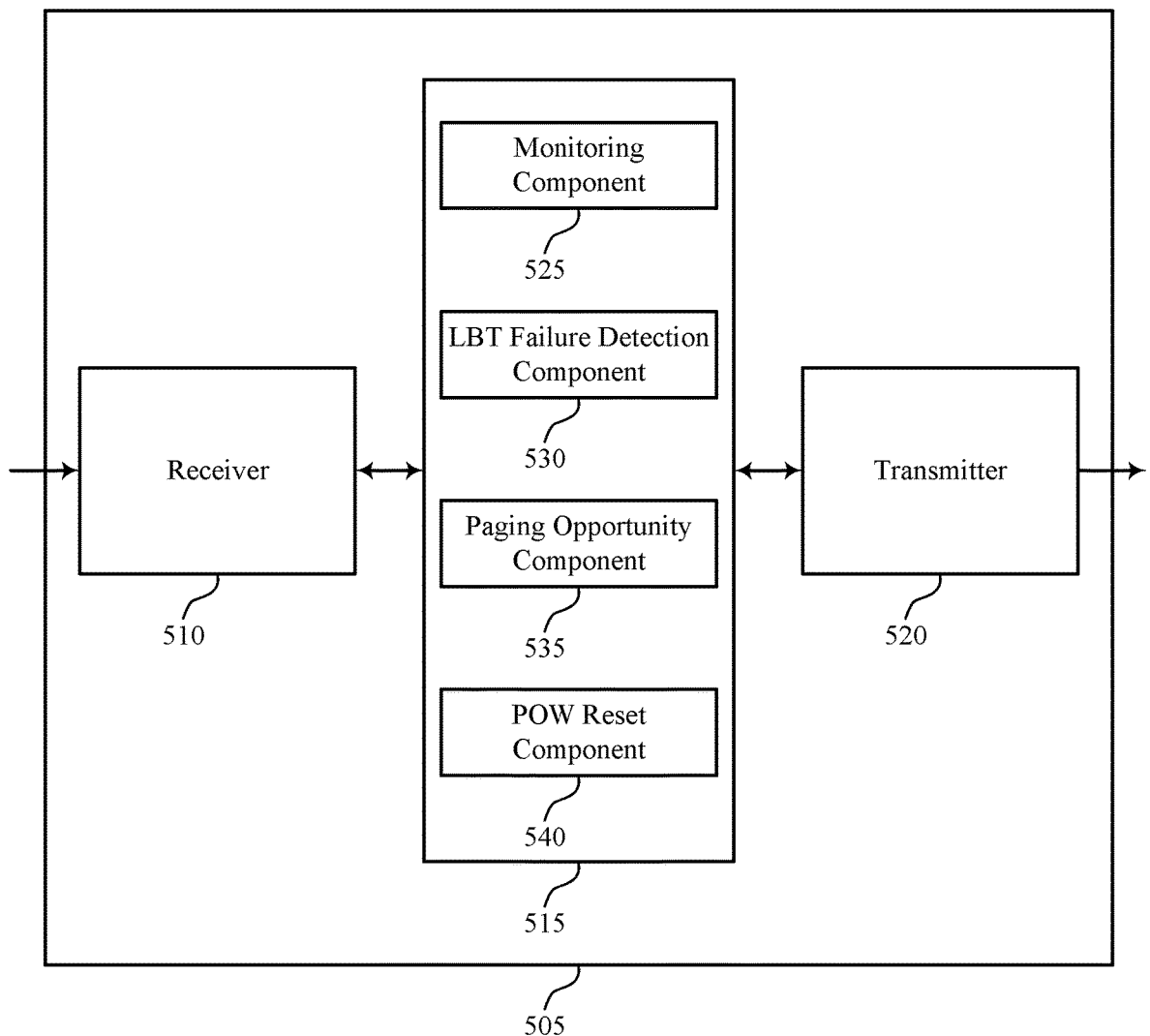

FIG. 5 shows a block diagram 500 of a wireless device 505 that supports energy-efficient paging in accordance with various aspects of the present disclosure. Wireless device 505 may be an example of aspects of a wireless device 405 or a UE 115 as described with reference to FIGS. 1 and 4. Wireless device 505 may include receiver 510, UE paging manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to energy-efficient paging, etc.).

Information may be passed on to other components of the device. The receiver 510 may be an example of aspects of the transceiver 735 described with reference to FIG. 7.

UE paging manager 515 may be an example of aspects of the UE paging manager 715 described with reference to FIG. 7. UE paging manager 515 may also include monitoring component 525, LBT failure detection component 530, paging opportunity component 535, and POW reset component 540.

Monitoring component 525 may monitor a cell during a first POW having a first duration, monitor the cell for a second duration during the second POW based on identifying the LBT failure condition, monitor a cell during one paging opportunity of an increased number of paging opportunities, and monitor the cell during a first subframe and a second subframe of a paging frame, where a message indicating the increased number of paging opportunities may be received during the second subframe of the paging frame. LBT failure detection component 530 may identify a LBT failure condition during the first POW based on the monitoring.

Paging opportunity component 535 may determine a number of paging opportunities. For example paging opportunity component 535 may determine a second duration for a second POW based on identifying the LBT failure condition and receive a message that indicates an increased number of paging opportunities for a UE, where the increased number of paging opportunities is greater than a nominal number of paging opportunities for the UE. In some cases, the second duration is greater than or equal to the first duration.

In some cases, receiving the message that indicates the increased number of paging opportunities includes receiving a message indicating that system information has changed. In some cases, the information may come in the form of an evolved system information block (eSIB) change that can be detected via a narrowband scan (e.g., instead of receiving an explicit message).

In some cases, the message indicating the increased number of paging opportunities includes a message indicating that a POW duration is insufficient for a number of UEs being paged. In some cases, the increased number of paging opportunities includes a decreased DRX cycle or an increased POW duration, or both.

POW reset component 540 may identify a POW reset condition (e.g., a page indicating a new paging configuration, a change in a performance metric, an indication that a base station has won a medium, or a change in system information). POW reset component 540 may also monitor the cell for the first duration during a third POW based on identifying the POW reset condition, identify a paging opportunity reset condition, and reset a DRX cycle or a POW duration based on identifying the paging opportunity reset condition. In some cases, identifying the paging opportunity reset condition comprises receiving a message indicating the paging opportunity reset condition, wherein the DRX cycle or POW duration is reset based at least in part on receiving the message indicating the paging opportunity reset condition.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may include a single antenna, or it may include a set of antennas.

Figure 6:
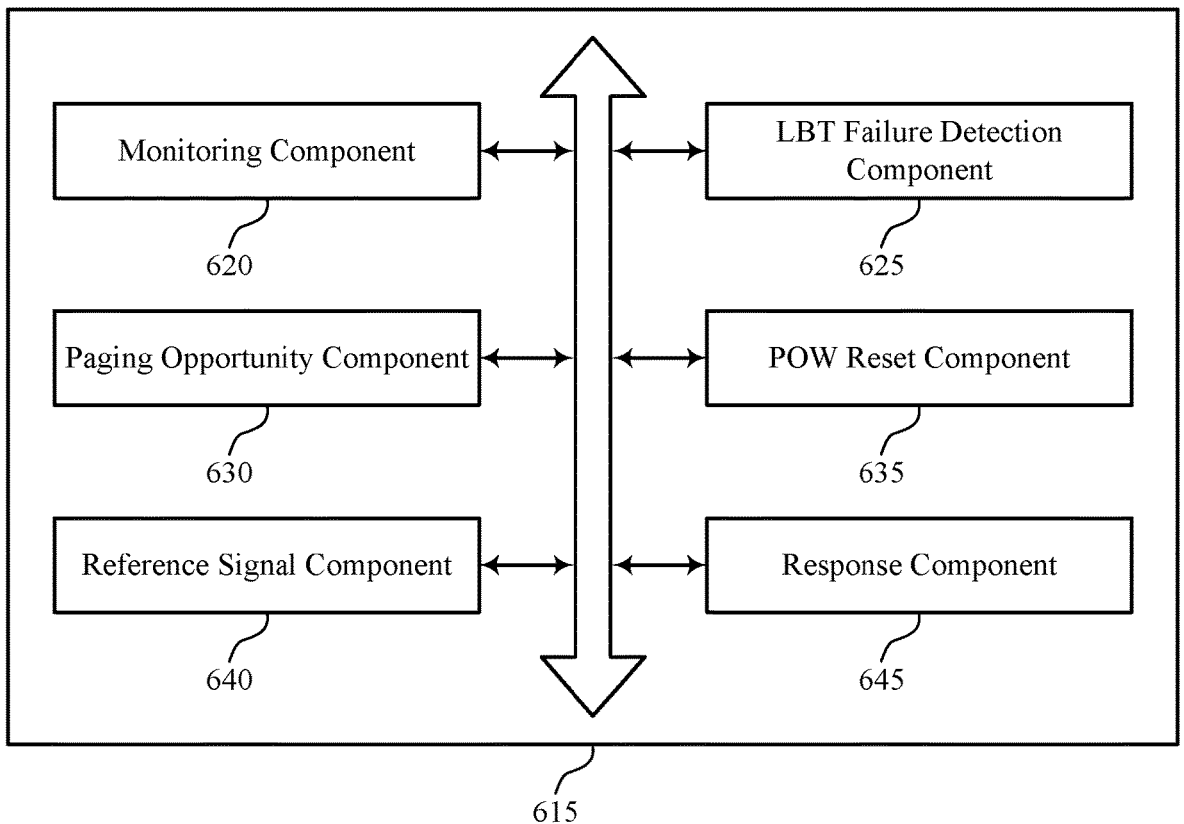

FIG. 6 shows a block diagram 600 of a UE paging manager 615 that supports energy-efficient paging in accordance with various aspects of the present disclosure. The UE paging manager 615 may be an example of aspects of a UE paging manager 415, a UE paging manager 515, or a UE paging manager 715 described with reference to FIGS. 4, 5, and 7. The UE paging manager 615 may include monitoring component 620, LBT failure detection component 625, paging opportunity component 630, POW reset component 635, reference signal component 640, and response component 645. Each of these modules may communicate, directly or indirectly, with one another (e.g., via one or more buses).

Monitoring component 620 may monitor a cell during a one or more POWs. LBT failure detection component 625 may identify a LBT failure condition during the first POW based on the monitoring. Paging opportunity component 630 may determine a number of paging opportunities.

POW reset component 635 may identify a POW reset condition, monitor the cell for the first duration during a third POW based on identifying the POW reset condition, identify a paging opportunity reset condition, and reset a DRX cycle or a POW duration based on identifying the paging opportunity reset condition.

Reference signal component 640 may determine that a number of missing reference signals exceeds a threshold, where the absence of the reference signal is identified based on determining that the threshold is exceeded. In some cases, identifying the LBT failure condition includes identifying an absence of a reference signal during the POW.

Response component 645 may transmit a response to the message, where the increased number of paging opportunities is based on the response.

Figure 7:
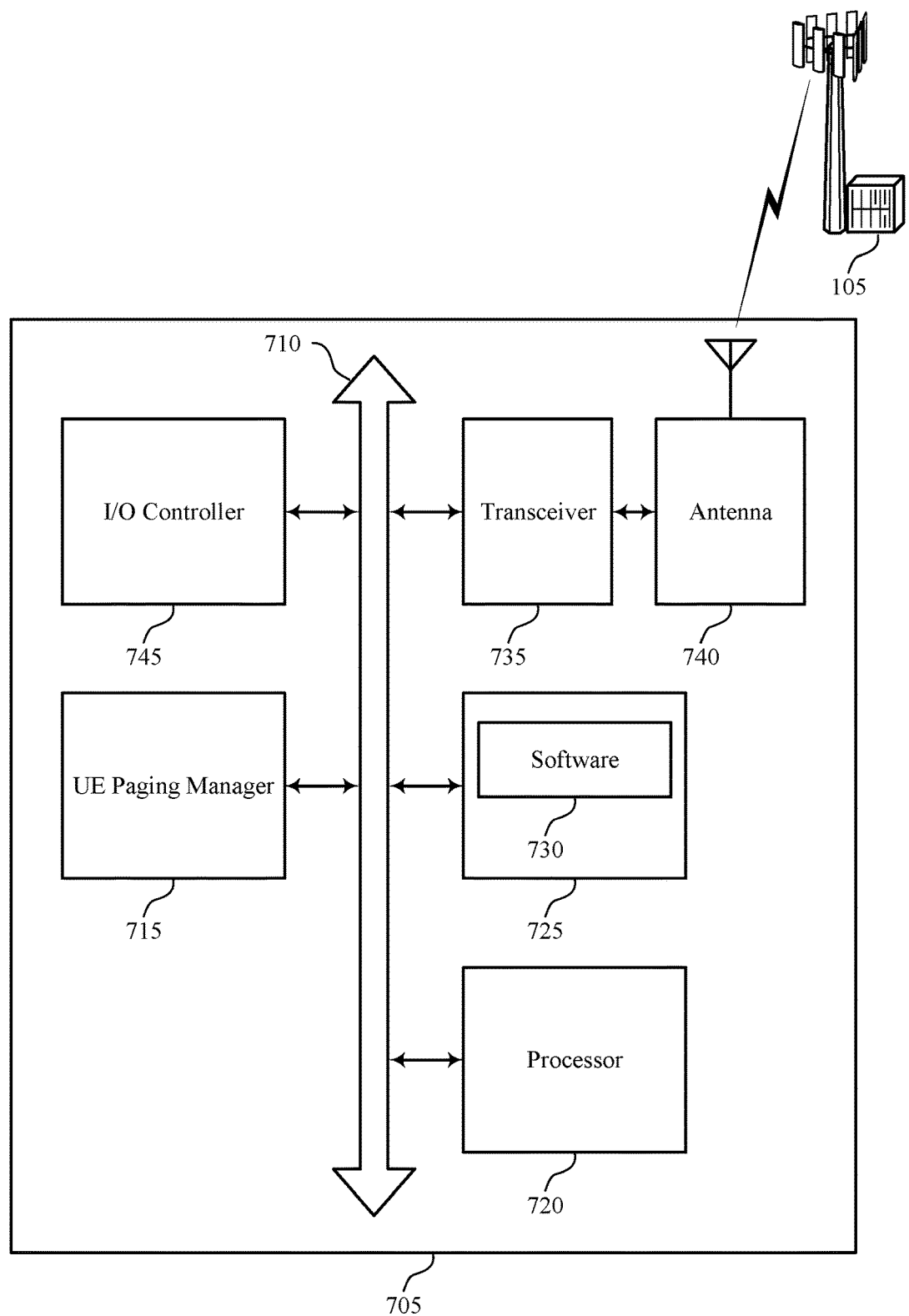
FIG. 7 illustrates a block diagram of a system including a UE that supports energy-efficient paging in accordance with aspects of the present disclosure.

FIG. 7 shows a diagram of a system 700 including a device 705 that supports energy-efficient paging in accordance with various aspects of the present disclosure. Device 705 may be an example of or include the components of wireless device 405, wireless device 505, or a UE 115 as described above, e.g., with reference to FIGS. 1, 4 and 5. Device 705 may include components for bi-directional voice and data communications including components for transmitting and receiving communications, including UE paging manager 715, processor 720, memory 725, software 730, transceiver 735, antenna 740, and I/O controller 745. These components may be in electronic communication via one or more busses (e.g., bus 710). Device 705 may communicate wirelessly with one or more base stations 105.

Processor 720 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting energy-efficient paging).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware and/or software operation such as the interaction with peripheral components or devices.

Software 730 may include code to implement aspects of the present disclosure, including code to support energy-efficient paging. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system.

Figure 8:
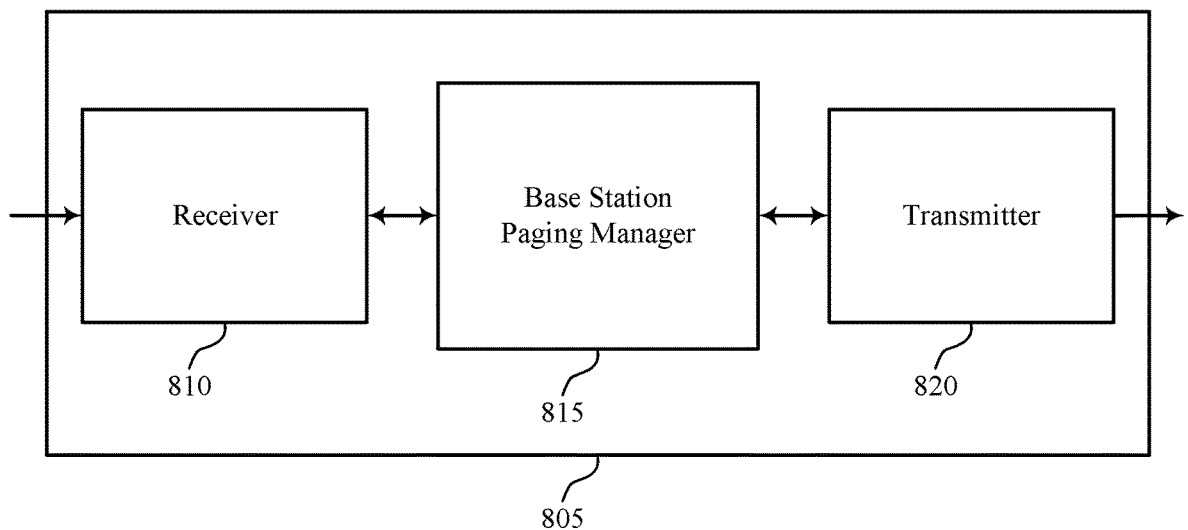
FIGS. 8 through 10 show block diagrams of a device that supports energy-efficient paging in accordance with aspects of the present disclosure.

FIG. 8 shows a block diagram 800 of a wireless device 805 that supports energy-efficient paging in accordance with various aspects of the present disclosure. Wireless device 805 may be an example of aspects of a base station 105 as described with reference to FIG. 1. Wireless device 805 may include receiver 810, base station paging manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to energy-efficient paging, etc.). Information may be passed on to other components of the device. The receiver 810 may be an example of aspects of the transceiver 1135 described with reference to FIG. 11.

Base station paging manager 815 may be an example of aspects of the base station paging manager 1115 described with reference to FIG. 11. Base station paging manager 815 may perform a LBT procedure during a first POW having a first duration, identify an LBT failure condition during the first POW based on performing the LBT procedure, and determine a second duration for a second POW based on identifying the LBT failure condition. In some cases, the second duration is greater than or equal to the first duration.

The base station paging manager 815 may also increase a number of paging opportunities based on a paging opportunity trigger condition, transmit a paging message or a reference signal to one or more user equipments (UEs) during one or more paging opportunities of the increased number of paging opportunities, identify a paging opportunity reset condition, and reset a DRX cycle or a POW duration based on the paging opportunity reset condition.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
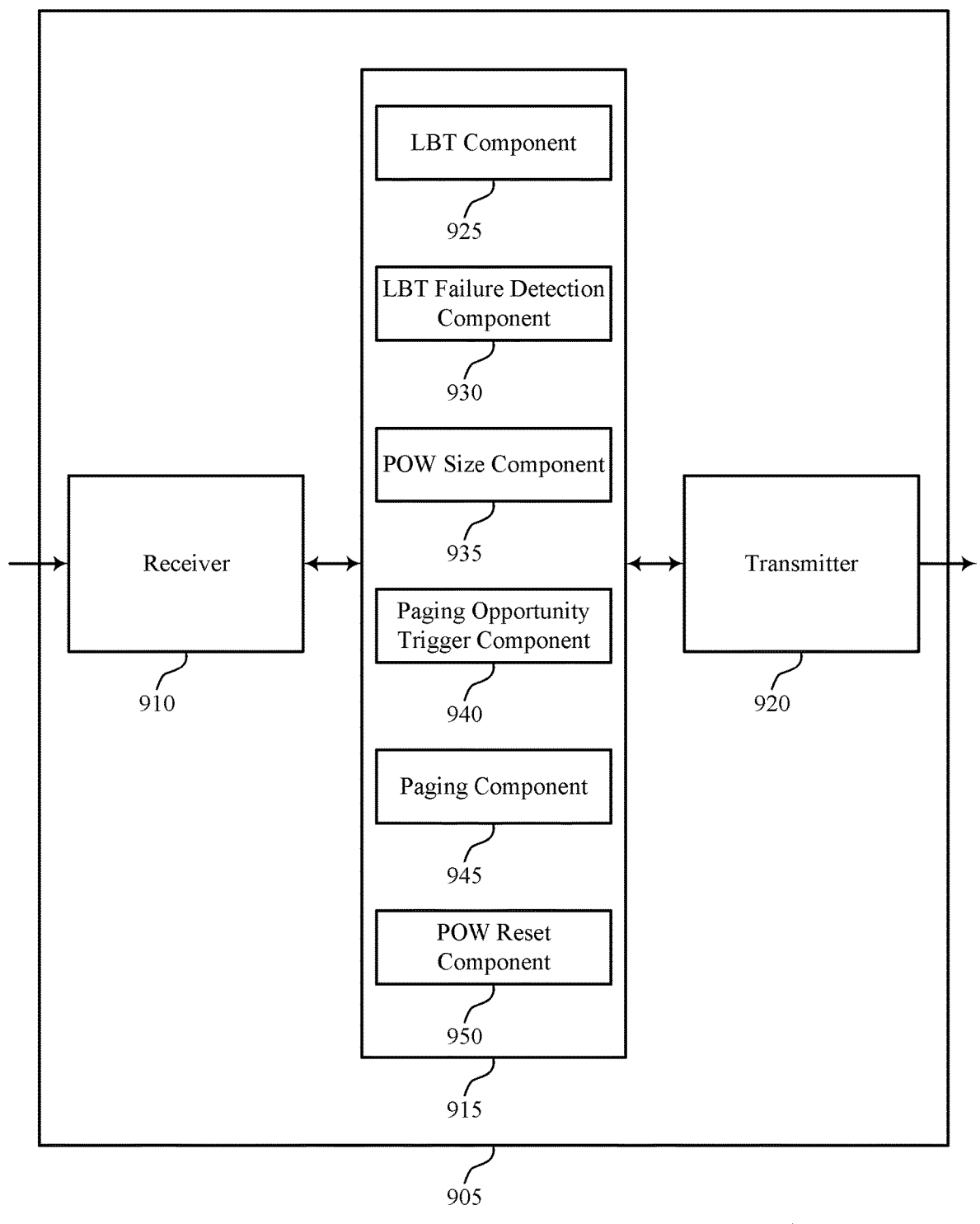

FIG. 9 shows a block diagram 900 of a wireless device 905 that supports energy-efficient paging in accordance with various aspects of the present disclosure. Wireless device 905 may be an example of aspects of a wireless device 805 or a base station 105 as described with reference to FIGS. 1 and 8. Wireless device 905 may include receiver 910, base station paging manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to energy-efficient paging, etc.). Information may be passed on to other components of the device. The receiver 910 may be an example of aspects of the transceiver 1135 described with reference to FIG. 11.

Base station paging manager 915 may be an example of aspects of the base station paging manager 1115 described with reference to FIG. 11. Base station paging manager 915 may also include LBT component 925, LBT failure detection component 930, POW size component 935, paging opportunity trigger component 940, paging component 945, and POW reset component 950.

LBT component 925 may perform a LBT procedure during a first POW having a first duration. LBT failure detection component 930 may identify an LBT failure condition during the first POW based on performing the LBT procedure.

POW size component 935 may determine and update a POW size. For example, POW size component 935 may determine a second duration for a second POW based on identifying the LBT failure condition. In some cases, the second duration is greater than or equal to the first duration.

Paging opportunity trigger component 940 may increase a number of paging opportunities based on a paging opportunity trigger condition, and reset the number of paging opportunities after identifying a paging opportunity reset condition.

For example, paging opportunity trigger component 940 may determine that a paging latency exceeds a threshold, where the paging opportunity trigger condition includes the threshold being exceeded, determine that a number of missed paging opportunities exceeds a threshold, where the paging opportunity trigger condition includes the threshold being exceeded, determine that a number of UEs impacted by paging latency or missed paging opportunities exceeds a threshold, where the paging opportunity trigger condition includes the threshold being exceeded, and determine that a time between successful LBT procedures for paging opportunities exceeds a threshold, where the paging opportunity trigger condition includes the threshold being exceeded.

In some cases, the number of UEs impacted by paging latency or missed paging opportunities is based on a UE class or service category. In some cases, the paging opportunity trigger condition is based on a condition of one or more UEs.

Paging component 945 may transmit a paging message or a reference signal to one or more UEs during one or more paging opportunities of the increased number of paging opportunities and transmit a message to at least one idle mode UE during a second subframe of a paging frame.

POW reset component 950 may identify a POW reset condition, transmit the reference signal or the paging message for the first duration during a third POW based on identifying the POW reset condition, and reset a DRX cycle or a POW duration based on the paging opportunity reset condition.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
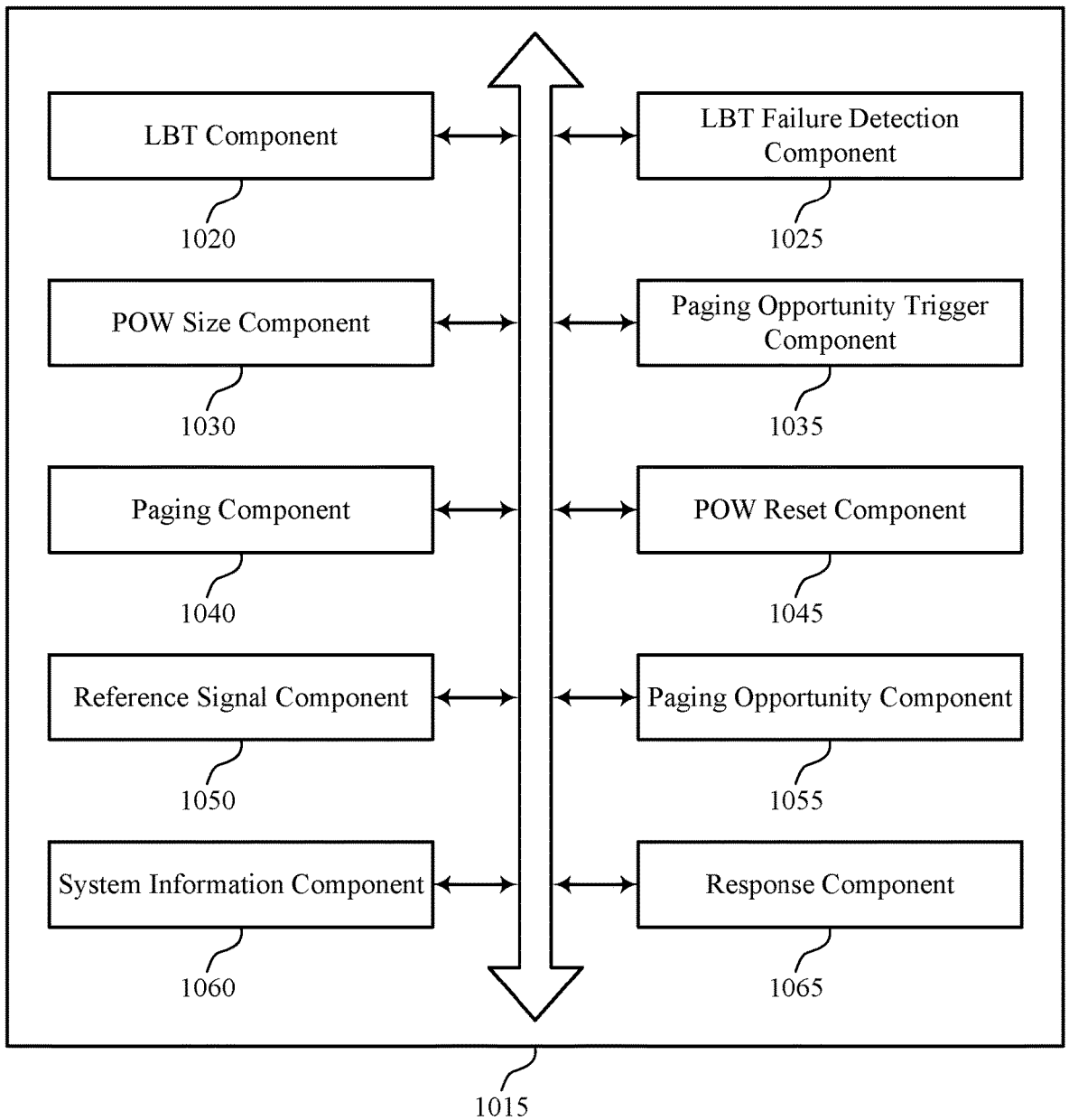

FIG. 10 shows a block diagram 1000 of a base station paging manager 1015 that supports energy-efficient paging in accordance with various aspects of the present disclosure. The base station paging manager 1015 may be an example of aspects of a base station paging manager 1115 described with reference to FIGS. 8, 9, and 11. The base station paging manager 1015 may include LBT component 1020, LBT failure detection component 1025, POW size component 1030, paging opportunity trigger component 1035, paging component 1040, POW reset component 1045, reference signal component 1050, paging opportunity component 1055, system information component 1060, and response component 1065. Each of these modules may communicate, directly or indirectly, with one another (e.g., via one or more buses).

LBT component 1020 may perform a LBT procedure during a first POW having a first duration. LBT failure detection component 1025 may identify an LBT failure condition during the first POW based on performing the LBT procedure.

POW size component 1030 may determine a second duration for a second POW based on identifying the LBT failure condition. In some examples, the second duration is greater than or equal to the first duration. Paging opportunity trigger component 1035 may increase a number of paging opportunities based on a paging opportunity trigger condition.

Paging component 1040 may transmit a paging message or a reference signal to one or more UEs during one or more paging opportunities of the increased number of paging opportunities and transmit a message to at least one idle mode UE during a second subframe of a paging frame.

POW reset component 1045 may identify a POW reset condition, transmit the reference signal or the paging message for the first duration during a third POW based on identifying the POW reset condition, and reset a DRX cycle or a POW duration based on the paging opportunity reset condition.

Reference signal component 1050 may transmit a reference signal or a paging message during a second POW that has the second duration. Paging opportunity component 1055 may increase the number of paging opportunities includes decreasing the DRX cycle or increasing the POW duration, or both and determine that decreasing the DRX cycle is prioritized over increasing the POW duration, where decreasing the DRX cycle or increasing POW duration, or both, is based on the determination.

System information component 1060 may transmit an indication that system information has changed and transmit a system information message indicating the increased number of paging opportunities. Response component 1065 may receive a response to the message from the at least one idle mode UE, where the number of paging opportunities is increased based on receiving the response.

Figure 11:
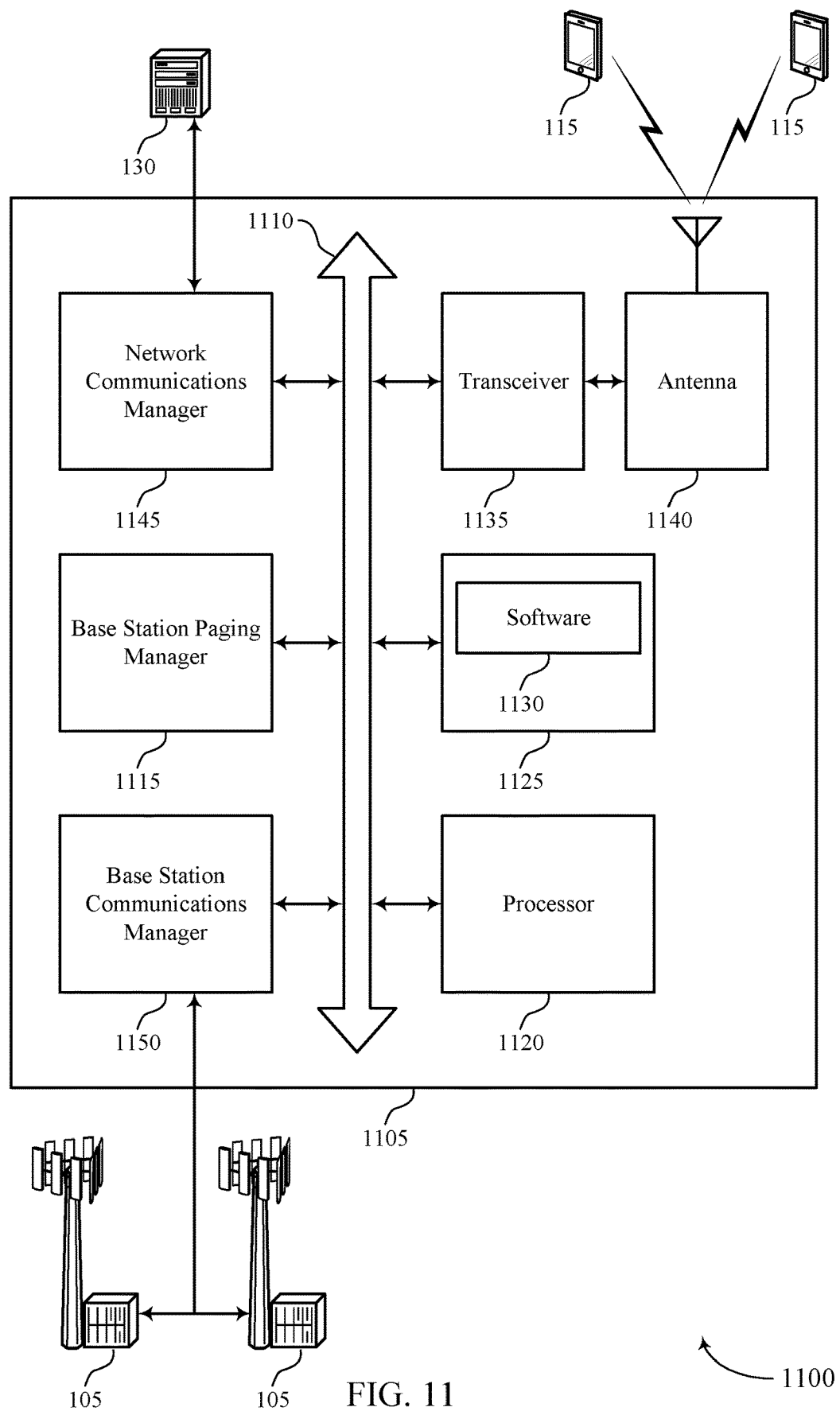
FIG. 11 illustrates a block diagram of a system including a base station that supports energy-efficient paging in accordance with aspects of the present disclosure.

FIG. 11 shows a diagram of a system 1100 including a device 1105 that supports energy-efficient paging in accordance with various aspects of the present disclosure. Device 1105 may be an example of or include the components of base station 105 as described above, e.g., with reference to FIG. 1. Device 1105 may include components for bi-directional voice and data communications including components for transmitting and receiving communications, including base station paging manager 1115, processor 1120, memory 1125, software 1130, transceiver 1135, antenna 1140, network communications manager 1145, and base station communications manager 1150. These components may be in electronic communication via one or more busses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting energy-efficient paging).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware and/or software operation such as the interaction with peripheral components or devices.

Software 1130 may include code to implement aspects of the present disclosure, including code to support energy-efficient paging. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Base station communications manager 1150 may manage communications with other base station 105, and may include a controller or scheduler for controlling communications with UEs 115 in cooperation with other base stations 105. For example, the base station communications manager

1150 may coordinate scheduling for transmissions to UEs 115 for various interference mitigation techniques such as beamforming or joint transmission. In some examples, base station communications manager 1150 may provide an X2 interface within an LTE/LTE-A wireless communication network technology to provide communication between base stations 105.

Figure 12:
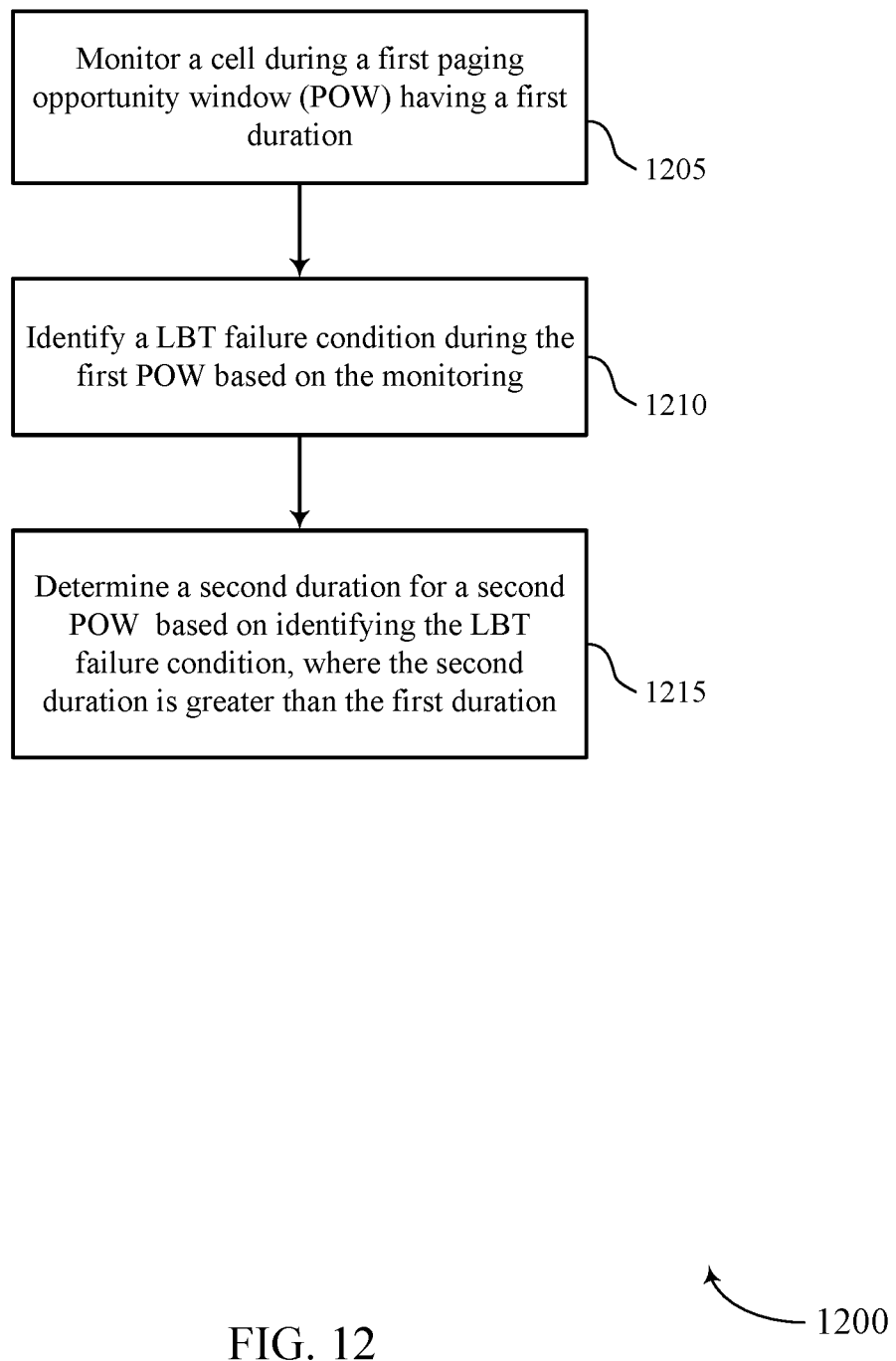
FIGS. 12 through 16 illustrate methods for energy-efficient paging in accordance with aspects of the present disclosure.

FIG. 12 shows a flowchart illustrating a method 1200 for energy-efficient paging in accordance with various aspects of the present disclosure. The operations of method 1200 may be implemented by a UE 115 or its components as described herein. For example, the operations of method 1200 may be performed by a UE paging manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may monitor a cell during a first POW having a first duration. The operations of block 1205 may be performed according to the methods described with reference to FIGS. 1 through 3. In certain examples, aspects of the operations of block 1205 may be performed by a monitoring component as described with reference to FIGS. 4 through 7.

At block 1210 the UE 115 may identify a LBT failure condition during the first POW based at least in part on the monitoring. The operations of block 1210 may be performed according to the methods described with reference to FIGS. 1 through 3. In certain examples, aspects of the operations of block 1210 may be performed by a LBT failure detection component as described with reference to FIGS. 4 through 7.

At block 1215 the UE 115 may determine a second duration for a second POW based at least in part on identifying the LBT failure condition. In some cases, the second duration is greater than or equal to the first duration. The operations of block 1215 may be performed according to the methods described with reference to FIGS. 1 through 3. In certain examples, aspects of the operations of block 1215 may be performed by a paging opportunity component as described with reference to FIGS. 4 through 7.

Figure 13:
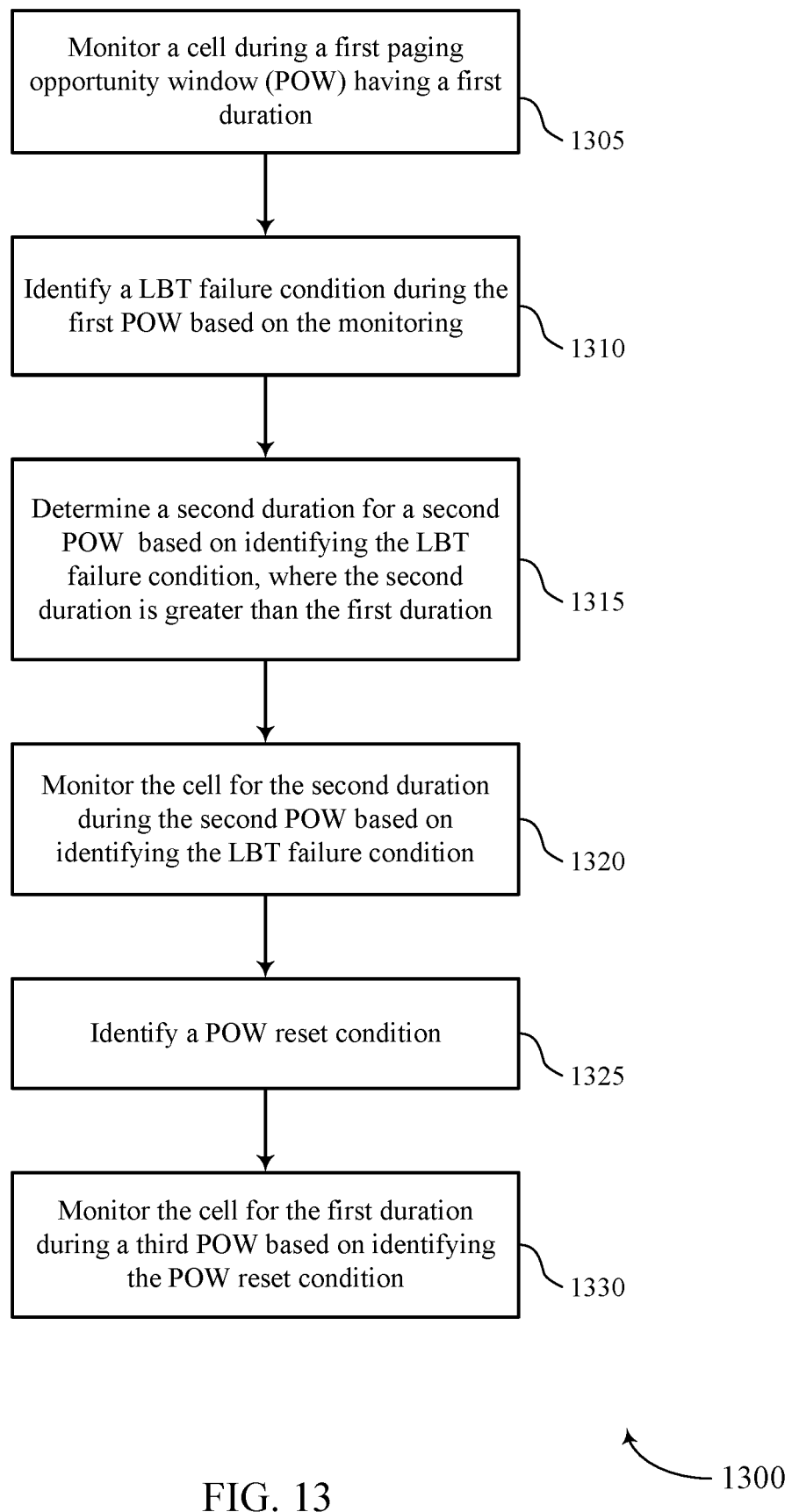

FIG. 13 shows a flowchart illustrating a method 1300 for energy-efficient paging in accordance with various aspects of the present disclosure. The operations of method 1300 may be implemented by a UE 115 or its components as described herein. For example, the operations of method 1300 may be performed by a UE paging manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may monitor a cell during a first POW having a first duration. The operations of block 1305 may be performed according to the methods described with reference to FIGS. 1 through 3. In certain examples, aspects of the operations of block 1305 may be performed by a monitoring component as described with reference to FIGS. 4 through 7.

At block 1310 the UE 115 may identify a LBT failure condition during the first POW based at least in part on the monitoring. The operations of block 1310 may be performed according to the methods described with reference to FIGS. 1 through 3. In certain examples, aspects of the operations of block 1310 may be performed by a LBT failure detection component as described with reference to FIGS. 4 through 7.

At block 1315 the UE 115 may determine a second duration for a second POW based at least in part on identifying the LBT failure condition. In some cases, the second duration is greater than or equal to the first duration. The operations of block 1315 may be performed according to the methods described with reference to FIGS. 1 through 3. In certain examples, aspects of the operations of block 1315 may be performed by a paging opportunity component as described with reference to FIGS. 4 through 7.

At block 1320 the UE 115 may monitor the cell for the second duration during the second POW based at least in part on identifying the LBT failure condition. The operations of block 1320 may be performed according to the methods described with reference to FIGS. 1 through 3. In certain examples, aspects of the operations of block 1320 may be performed by a monitoring component as described with reference to FIGS. 4 through 7.

At block 1325 the UE 115 may identify a POW reset condition. The operations of block 1325 may be performed according to the methods described with reference to FIGS. 1 through 3. In certain examples, aspects of the operations of block 1325 may be performed by a POW reset component as described with reference to FIGS. 4 through 7. In some cases, identifying a POW reset condition may comprise receiving a message indicating the paging opportunity reset condition, wherein the DRX cycle or POW duration is reset based at least in part on receiving the message indicating the paging opportunity reset condition.

At block 1330 the UE 115 may monitor the cell for the first duration during a third POW based at least in part on identifying the POW reset condition. The operations of block 1330 may be performed according to the methods described with reference to FIGS. 1 through 3. In certain examples, aspects of the operations of block 1330 may be performed by a POW reset component as described with reference to FIGS. 4 through 7.

Figure 14:
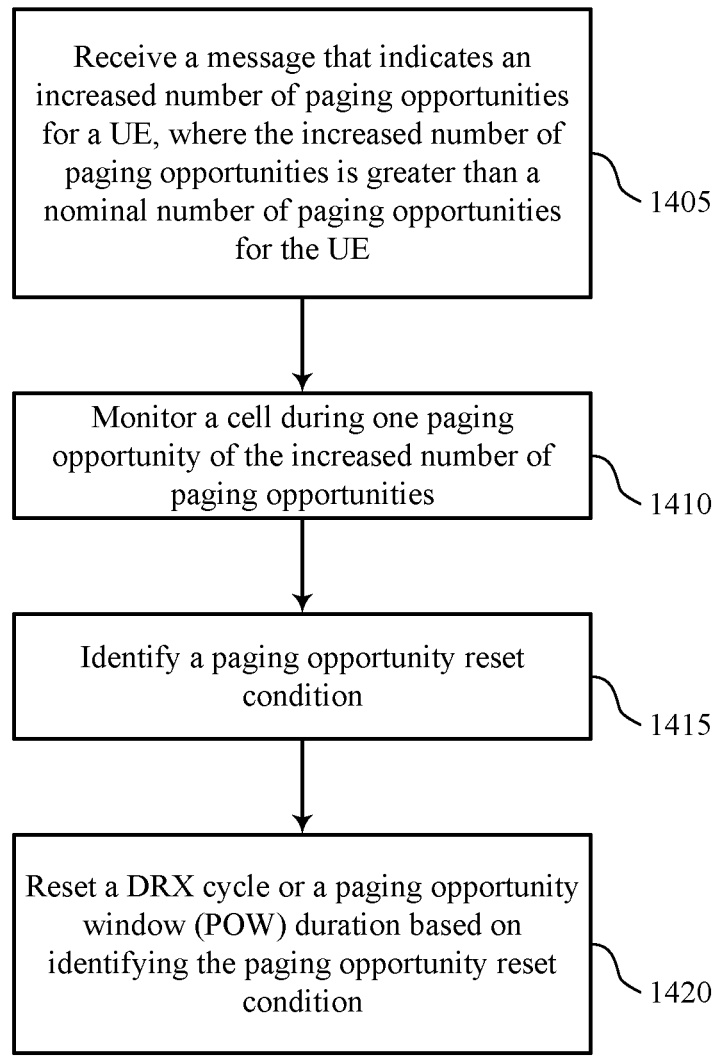

FIG. 14 shows a flowchart illustrating a method 1400 for energy-efficient paging in accordance with various aspects of the present disclosure. The operations of method 1400 may be implemented by a UE 115 or its components as described herein. For example, the operations of method 1400 may be performed by a UE paging manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive a message that indicates an increased number of paging opportunities for a UE 115, wherein the increased number of paging opportunities is greater than a nominal number of paging opportunities for the UE. The operations of block 1405 may be performed according to the methods described with reference to FIGS. 1 through 3. In certain examples, aspects of the operations of block 1405 may be performed by a paging opportunity component as described with reference to FIGS. 4 through 7.

At block 1410 the UE 115 may monitor a cell during one paging opportunity of the increased number of paging opportunities. The operations of block 1410 may be performed according to the methods described with reference to FIGS. 1 through 3. In certain examples, aspects of the operations of block 1410 may be performed by a monitoring component as described with reference to FIGS. 4 through 7.

At block 1415 the UE 115 may identify a paging opportunity reset condition. The operations of block 1415 may be performed according to the methods described with reference to FIGS. 1 through 3. In certain examples, aspects of the operations of block 1415 may be performed by a POW reset component as described with reference to FIGS. 4 through 7.

At block 1420 the UE 115 may reset a DRX cycle or a POW duration based at least in part on identifying the paging opportunity reset condition. The operations of block 1420 may be performed according to the methods described with reference to FIGS. 1 through 3. In certain examples, aspects of the operations of block 1420 may be performed by a POW reset component as described with reference to FIGS. 4 through 7.

Figure 15:
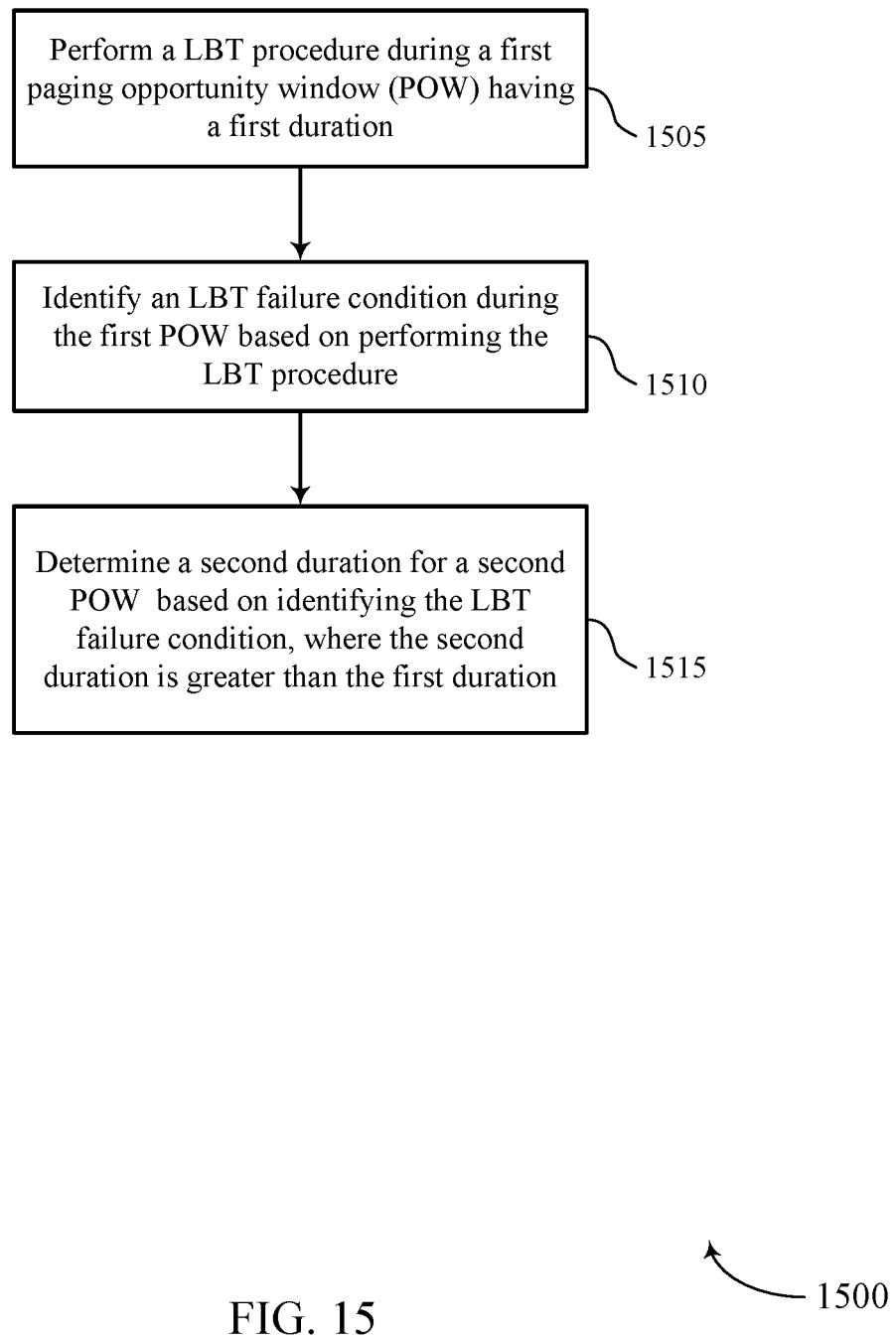

FIG. 15 shows a flowchart illustrating a method 1500 for energy-efficient paging in accordance with various aspects of the present disclosure. The operations of method 1500 may be implemented by a base station 105 or its components as described herein. For example, the operations of method 1500 may be performed by a base station paging manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may perform a LBT procedure during a first POW having a first duration. The operations of block 1505 may be performed according to the methods described with reference to FIGS. 1 through 3. In certain examples, aspects of the operations of block 1505 may be performed by a LBT component as described with reference to FIGS. 8 through 11.

At block 1510 the base station 105 may identify an LBT failure condition during the first POW based at least in part on performing the LBT procedure. The operations of block 1510 may be performed according to the methods described with reference to FIGS. 1 through 3. In certain examples, aspects of the operations of block 1510 may be performed by a LBT failure detection component as described with reference to FIGS. 8 through 11.

At block 1515 the base station 105 may determine a second duration for a second POW based at least in part on identifying the LBT failure condition. In some cases, the second duration is greater than or equal to the first duration. The operations of block 1515 may be performed according to the methods described with reference to FIGS. 1 through 3. In certain examples, aspects of the operations of block 1515 may be performed by a POW size component as described with reference to FIGS. 8 through 11.

Figure 16:
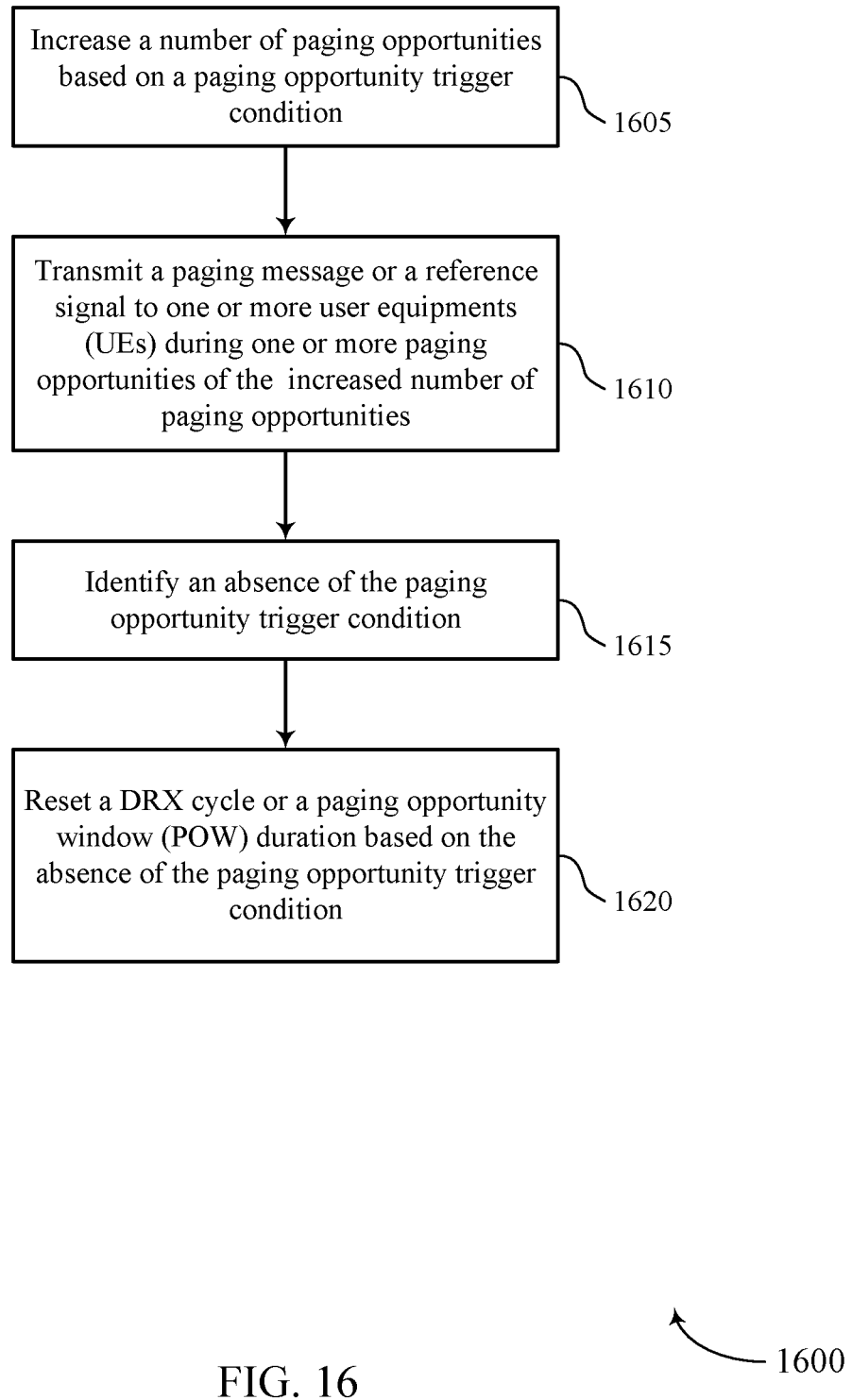

FIG. 16 shows a flowchart illustrating a method 1600 for energy-efficient paging in accordance with various aspects of the present disclosure. The operations of method 1600 may be implemented by a base station 105 or its components as described herein. For example, the operations of method 1600 may be performed by a base station paging manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may increase a number of paging opportunities based at least in part on a paging opportunity trigger condition. The operations of block 1605 may be performed according to the methods described with reference to FIGS. 1 through 3. In certain examples, aspects of the operations of block 1605 may be performed by a paging opportunity trigger component as described with reference to FIGS. 8 through 11.

At block 1610 the base station 105 may transmit a paging message or a reference signal to one or more UEs during one or more paging opportunities of the increased number of paging opportunities. The operations of block 1610 may be performed according to the methods described with reference to FIGS. 1 through 3. In certain examples, aspects of the operations of block 1610 may be performed by a paging component as described with reference to FIGS. 8 through 11.

At block 1615 the base station 105 may identify a paging opportunity reset condition. The operations of block 1615 may be performed according to the methods described with reference to FIGS. 1 through 3. In certain examples, aspects of the operations of block 1615 may be performed by a paging opportunity trigger component as described with reference to FIGS. 8 through 11.

At block 1620 the base station 105 may reset a DRX cycle or a POW duration based at least in part on the paging opportunity reset condition. The operations of block 1620 may be performed according to the methods described with reference to FIGS. 1 through 3. In certain examples, aspects of the operations of block 1620 may be performed by a POW reset component as described with reference to FIGS. 8 through 11.

It should be noted that the methods 1200, 1300, 1400, 1500, and 1600 described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a message that indicates an increased number of paging opportunities for a user equipment (UE), wherein the increased number of paging opportunities is greater than a nominal number of paging opportunities for the UE, and wherein the increased number of paging opportunities is based at least in part on a number of UEs, including the UE, impacted by paging latency or missed paging opportunities exceeding a threshold;
setting, based at least in part on the indication of the increased number of paging opportunities, a duration of a paging opportunity window (POW) to be longer than a POW duration associated with the nominal number of paging opportunities for the UE;
monitoring a cell during one paging opportunity of the increased number of paging opportunities;
identifying a paging opportunity reset condition; and
resetting the duration of the POW to the nominal number of paging opportunities based at least in part on identifying the paging opportunity reset condition.

2. The method of claim 1, wherein receiving the message that indicates the increased number of paging opportunities comprises:
receiving a message indicating that system information has changed.

3. The method of claim 1, further comprising:
monitoring the cell during a first subframe and a second subframe of a paging frame; and
transmitting a response to the message, wherein the increased number of paging opportunities is based at least in part on the response.

4. The method of claim 1, wherein the message indicating the increased number of paging opportunities comprises a message indicating that a POW duration is insufficient for a number of UEs being paged.

5. The method of claim 1, wherein the increased number of paging opportunities comprises a decreased DRX cycle or an increased POW duration, or both.

6. The method of claim 1, wherein identifying the paging opportunity reset condition comprises:
receiving a message indicating the paging opportunity reset condition, wherein the DRX cycle or POW duration is reset based at least in part on receiving the message indicating the paging opportunity reset condition.

7. The method of claim 1, wherein the number of UEs impacted by paging latency or missed paging opportunities is based at least in part on a UE class or service category.

8. The method of claim 1, wherein the POW is a period of time that the UE monitors for a page between sleep cycles.

9. The method of claim 1, wherein the POW occurs during a discontinuous reception (DRX) cycle, the method further comprising setting a period of the DRX cycle.

10. A method for wireless communication, comprising:
determining that a number of user equipments (UEs) impacted by paging latency or missed paging opportunities exceeds a first threshold;
increasing a number of paging opportunities based at least in part on a paging opportunity trigger condition, wherein the paging opportunity trigger condition comprises the first threshold being exceeded, and wherein increasing the number of paging opportunities comprises transmitting a message to a UE of the number of UEs that indicates use of a paging opportunity window (POW) with a duration that is longer than a POW duration associated with a nominal number of paging opportunities for the UE;
transmitting a paging message or a reference signal to the UE during one or more paging opportunities of the increased number of paging opportunities;
identifying a paging opportunity reset condition; and
resetting the duration of the POW to the nominal number of paging opportunities based at least in part on the identified paging opportunity reset condition.

11. The method of claim 10, further comprising:
determining that a paging latency exceeds a second threshold, wherein the paging opportunity trigger condition comprises the second threshold being exceeded.

12. The method of claim 10, further comprising:
determining that a number of missed paging opportunities exceeds a third threshold, wherein the paging opportunity trigger condition comprises the third threshold being exceeded.

13. The method of claim 10, wherein the paging opportunity trigger condition is based at least in part on a condition of one or more UEs.

14. The method of claim 10, further comprising:
determining that a time between successful listen-before-talk (LBT) procedures for paging opportunities exceeds a fourth threshold, wherein the paging opportunity trigger condition comprises the fourth threshold being exceeded.

15. The method of claim 10, further comprising:
increasing the number of paging opportunities comprises decreasing the DRX cycle or increasing the POW duration, or both.

16. The method of claim 15, further comprising:
determining that decreasing the DRX cycle is prioritized over increasing the POW duration, wherein decreasing the DRX cycle or increasing POW duration, or both, is based at least in part on the determination.

17. The method of claim 10, further comprising:
transmitting an indication that system information has changed; and
transmitting a system information message indicating the increased number of paging opportunities.

18. The method of claim 10, further comprising:
transmitting a message to at least one idle mode UE during a second subframe of a paging frame; and
receiving a response to the message from the at least one idle mode UE, wherein the number of paging opportunities is increased based at least in part on receiving the response.

19. An apparatus for wireless communication, comprising:
a processor;
memory coupled with the processor; and
instructions stored in the memory and operable, when executed by the processor, to cause the apparatus to:
receive a message that indicates an increased number of paging opportunities for a user equipment (UE), wherein the increased number of paging opportunities is greater than a nominal number of paging opportunities for the UE, and wherein the increased number of paging opportunities is based at least in part on a number of UEs, including the UE, impacted by paging latency or missed paging opportunities exceeding a threshold;
set, based at least in part on the indication of the increased number of paging opportunities, a duration of a paging opportunity window (POW) to be longer than a POW duration associated with the nominal number of paging opportunities for the UE;
monitor a cell during one paging opportunity of the increased number of paging opportunities;
identify a paging opportunity reset condition; and
reset the duration of the POW to the nominal number of paging opportunities based at least in part on identifying the paging opportunity reset condition.

20. The apparatus of claim 19, wherein the instructions are further executable by the processor to cause the apparatus to:
monitor the cell during a first subframe and a second subframe of a paging frame; and
transmit a response to the message, wherein the increased number of paging opportunities is based at least in part on the response.

21. The apparatus of claim 19, wherein the increased number of paging opportunities comprises a decreased DRX cycle or an increased POW duration, or both.

22. The apparatus of claim 19, wherein the instructions are further executable by the processor to cause the apparatus to:
identify the paging opportunity reset condition based at least in part on receiving a message indicating the paging opportunity reset condition; and
reset the DRX cycle or POW duration based at least in part on receiving the message indicating the paging opportunity reset condition.

23. An apparatus for wireless communication, comprising:
a processor;
memory coupled with the processor; and
instructions stored in the memory and operable, when executed by the processor, to cause the apparatus to:
determine that a number of user equipments (UEs) impacted by paging latency or missed paging opportunities exceeds a first threshold;
increase a number of paging opportunities based at least in part on a paging opportunity trigger condition, wherein the paging opportunity trigger condition comprises the first threshold being exceeded, and wherein the instructions configured to cause the apparatus to increase the number of paging opportunities comprises instructions configured to cause the apparatus to transmit a message to a UE of the number of UEs that indicates use of a paging opportunity window (POW) with a duration that is longer than a POW duration associated with a nominal number of paging opportunities for the UE;
transmit a paging message or a reference signal to the UE during one or more paging opportunities of the increased number of paging opportunities;
identify a paging opportunity reset condition; and
reset the duration of the POW to the nominal number of paging opportunities based at least in part on the paging opportunity reset condition.

24. The apparatus of claim 23, wherein the instructions are further executable by the processor to cause the apparatus to:
determine that a paging latency exceeds a second threshold, wherein the paging opportunity trigger condition comprises the second threshold being exceeded.

25. The apparatus of claim 23, wherein the instructions are further executable by the processor to cause the apparatus to:
determine that a number of missed paging opportunities exceeds a third threshold, wherein the paging opportunity trigger condition comprises the third threshold being exceeded.

26. The apparatus of claim 23, wherein the instructions are further executable by the processor to cause the apparatus to:
determine that a time between successful listen-before-talk (LBT) procedures for paging opportunities exceeds a fourth threshold, wherein the paging opportunity trigger condition comprises the fourth threshold being exceeded.

27. The apparatus of claim 23, wherein the instructions are further executable by the processor to cause the apparatus to:
increase the number of paging opportunities comprises decreasing the DRX cycle or increasing the POW duration, or both.

28. The apparatus of claim 27, wherein the instructions are further executable by the processor to cause the apparatus to:
determine that decreasing the DRX cycle is prioritized over increasing the POW duration, wherein decreasing the DRX cycle or increasing POW duration, or both, is based at least in part on the determination.

29. The apparatus of claim 23, wherein the instructions are further executable by the processor to cause the apparatus to:
transmit an indication that system information has changed; and
transmit a system information message indicating the increased number of paging opportunities.

30. The apparatus of claim 23, wherein the instructions are further executable by the processor to cause the apparatus to:
transmit a message to at least one idle mode UE during a second subframe of a paging frame; and
receive a response to the message from the at least one idle mode UE, wherein the number of paging opportunities is increased based at least in part on receiving the response.

* * * * *